United States Patent [19]
DeLapa et al.

[11] Patent Number: 6,076,068
[45] Date of Patent: *Jun. 13, 2000

[54] COUPON DELIVERY SYSTEM

[75] Inventors: James P. DeLapa; James W. Willman, both of Grand Rapids, Mich.

[73] Assignee: Ad Response MicroMarketing Corporation, Grand Rapids, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/713,205

[22] Filed: Sep. 12, 1996

Related U.S. Application Data

[63] Continuation-in-part of application No. 08/470,224, Jun. 6, 1995, abandoned, which is a continuation-in-part of application No. 08/316,909, Oct. 3, 1994, Pat. No. 5,822,735, which is a continuation of application No. 07/947,285, Sep. 17, 1992, Pat. No. 5,353,218.

[51] Int. Cl.⁷ .................................................. G06F 17/60

[52] U.S. Cl. ................................ 705/14; 235/383; 186/52

[58] Field of Search .............................. 705/14; 235/383; 382/139, 100; 364/479.01; 186/52

[56] References Cited

U.S. PATENT DOCUMENTS

| | | | |
|---|---|---|---|
| Re. 34,915 | 4/1995 | Nichtberger et al. | 705/14 |
| 3,211,470 | 10/1965 | Wilson . | |
| 4,554,446 | 11/1985 | Murphy et al. | 235/487 |
| 4,634,147 | 1/1987 | McClure | 283/56 |
| 4,674,041 | 6/1987 | Lemon et al. | 705/14 |
| 4,723,212 | 2/1988 | Mindrum et al. | 705/14 |
| 4,752,675 | 6/1988 | Zetmeir | 235/375 |
| 4,791,281 | 12/1988 | Johnsen et al. | 705/14 |
| 4,833,308 | 5/1989 | Humble | 235/383 |
| 4,853,852 | 8/1989 | Rosen | 705/10 |
| 4,862,386 | 8/1989 | Axelrod et al. | 707/507 |
| 4,882,675 | 11/1989 | Nichtberger et al. | 705/14 |
| 4,896,791 | 1/1990 | Smith | 221/7 |
| 4,908,761 | 3/1990 | Tai | 705/14 |
| 4,910,672 | 3/1990 | Off et al. | 705/14 |
| 4,949,256 | 8/1990 | Humble | 705/14 |
| 4,957,311 | 9/1990 | Geisenheimer | 283/56 |
| 4,964,053 | 10/1990 | Humble | 705/416 |

(List continued on next page.)

OTHER PUBLICATIONS

Brochure entitled "What is the Grocery Network System?" published by Inter•Act Systems, Inc., Apr. 18, 1996.

Article entitled "Inter–Act Systems formally announced the launch of the Grocery Network System (GNS)," published by In–Store, Mar., 1996.

"Corporate Profile for Inter–Act Systems," published by Business Wire, Jul. 12, 1996.

Article entitled "SSDS Inc. and Inter–Act Systems implement new 'clipless' coupon program in major grocery stores in the Northeast," published by Business Wire, Sep. 4, 1996.

(List continued on next page.)

*Primary Examiner*—Emanuel Todd Voeltz
*Assistant Examiner*—Raquel Alvarez
*Attorney, Agent, or Firm*—Van Dyke, Gardner, Linn & Burkhart, LLP

[57] ABSTRACT

A computer-implemented method and apparatus for generating coupons to provide discounts for purchases includes providing a computer-based kiosk at a retail establishment such as a grocery store. A user identification of a household is received at the kiosk. The kiosk outputs a series of targeted coupons which have been assigned to the individual household on the basis of at least one attribute of that household. Images of coupons may be formatted "on the fly" from parameters set forth in a coupon record. The system may further include an enhancement system which provides tools for enhancing the coupon offer data by designating particular offers as either a targeted coupon offer assigned to individual households as a function of purchases by that household or a mandatory coupon which is assigned to substantially all households. The kiosk may additionally print personalized messages by substituting for a keyword a value derived from an attribute of the identified household and outputting the graphic image of the personalized message.

33 Claims, 22 Drawing Sheets

U.S. PATENT DOCUMENTS

| | | | |
|---|---|---|---|
| 4,973,952 | 11/1990 | Malec et al. | 340/825.35 |
| 4,982,346 | 1/1991 | Girouard et al. | 705/14 |
| 5,053,955 | 10/1991 | Peach et al. | 705/14 |
| 5,056,019 | 10/1991 | Schultz et al. | 705/14 |
| 5,128,520 | 7/1992 | Rando et al. | 235/375 |
| 5,173,851 | 12/1992 | Off et al. | 705/14 |
| 5,176,224 | 1/1993 | Spector | 185/52 |
| 5,195,133 | 3/1993 | Kapp et al. | 380/9 |
| 5,201,010 | 4/1993 | Deaton et al. | 382/139 |
| 5,249,044 | 9/1993 | Von Kohorn | 705/14 |
| 5,250,789 | 10/1993 | Johnsen | 235/383 |
| 5,256,863 | 10/1993 | Ferguson et al. | 380/24 |
| 5,305,197 | 4/1994 | Axler et al. | 705/14 |
| 5,353,218 | 10/1994 | De Lapa et al. | 705/14 |
| 5,380,991 | 1/1995 | Valencia et al. | 235/383 |
| 5,430,644 | 7/1995 | Deaton et al. | 705/14 |
| 5,448,471 | 9/1995 | Deaton et al. | 705/14 |
| 5,459,306 | 10/1995 | Stein et al. | 235/383 |
| 5,481,094 | 1/1996 | Suda | 705/14 |
| 5,483,049 | 1/1996 | Schulze, Jr. | 705/14 |
| 5,502,636 | 3/1996 | Clarke | 705/10 |
| 5,515,270 | 5/1996 | Weinblatt | 705/14 |
| 5,621,812 | 4/1997 | Deaton et al. | 382/150 |
| 5,638,457 | 6/1997 | Deaton et al. | 382/100 |
| 5,642,485 | 6/1997 | Deaton et al. | 705/14 |
| 5,644,723 | 7/1997 | Deaton et al. | 705/14 |
| 5,649,114 | 7/1997 | Deaton et al. | 705/14 |
| 5,710,886 | 1/1998 | Christensen et al. | 705/14 |
| 5,832,457 | 11/1998 | O'Brien et al. | 705/14 |
| 5,857,175 | 1/1999 | Day et al. | 705/14 |
| 5,892,827 | 4/1999 | Beach et al. | 380/24 |

OTHER PUBLICATIONS

Article entitled "The Catalina Marketing Frequent Shopper Service Offers Flexible Menu of Turnkey Electronic Database Marketing Programs," Press Release, May 2, 1996.

Article entitled "Supersegmentation: Partnering for Profits," published May, 1992, in *Food Engineering*.

Richard Shulman, "Electronic Marketing", Supermarket Business, pp. 1–3, Feb. 1988.

Ronald Tanner, "A New Dimension In Marketing", Progressive Grocer, pp. 133, 134 and 136, May 1987.

Michael Mcdermott, "Supermarkets Become Marketing–Driven For The 1960s", Adweek's Marketing Week pp. 1–2, Mar. 1990.

"Bar Codes Capture Info", Target Marketing, p. 1, Jan. 1989.

Fischman, C.; "Dahl's Store is Testing Frequent Shopper Plan;" *Supermarket News*; vol. 39, No. 38, p. 49(1); Sep. 18, 1989; Dialog: File 148, Account #04112465.

Thayer, W.; "Database Marketing Demystified;" *Progressive Grocer*; vol. 68, No. 11, p. 21(6); Nov., 1989; Dialog: File 148, Account #04150369.

U.S. application No. 08/470,224, DeLapa et al., filed Jun. 6, 1995, entitled Computer–Implemented Method and Apparatus For Identifying Products That Are of Likely Interest to Purchasers in a Retail Establishment, now pending.

Sloane, Martin, "Electronic Coupon Idea Shows Vision," *The Herald–Palladium*, Benton Harbor, Michigan, Jul. 6, 1992.

Garry, Michael, "Coupon Scanning Breaks New Ground," *Progressive Grocer*, May, 1992.

Radigan, Mary, "Super Scanners—Area Grocers Jumping onto Multi–Faceted, High–Tech Bandwagon," *The Grand Rapids Press*, Grand Rapids, Michigan, Jun. 28, 1992.

Advo Marketing brochure entitled "Advo Sells Food," publication date unknown.

Teitelbaum, Richard S., "Companies to Watch—Catalina Marketing," *Fortune*, vol. 125, No. 10, May 18, 1992.

Specimen coupons produced by Catalina Marketing, publication date unknown.

F & M coupon and letter publication, published prior to Aug. 15, 1992.

CMT (Critical Mass Targeted) literature, "Select & Save Database Co–Op Coupon Program," publication date unknown.

Safeway coupon and letter publication, published prior to May 9, 1991.

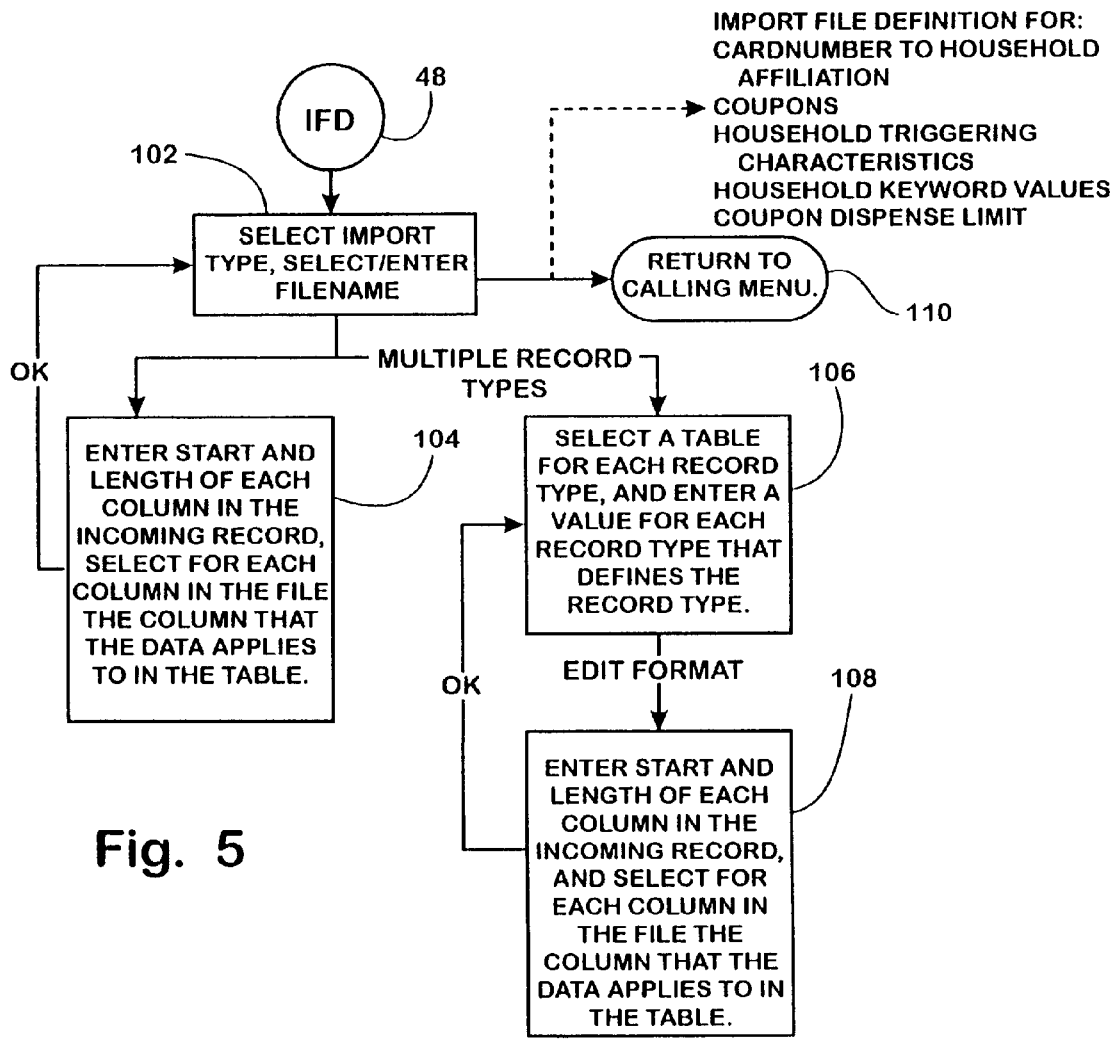
Fig. 5
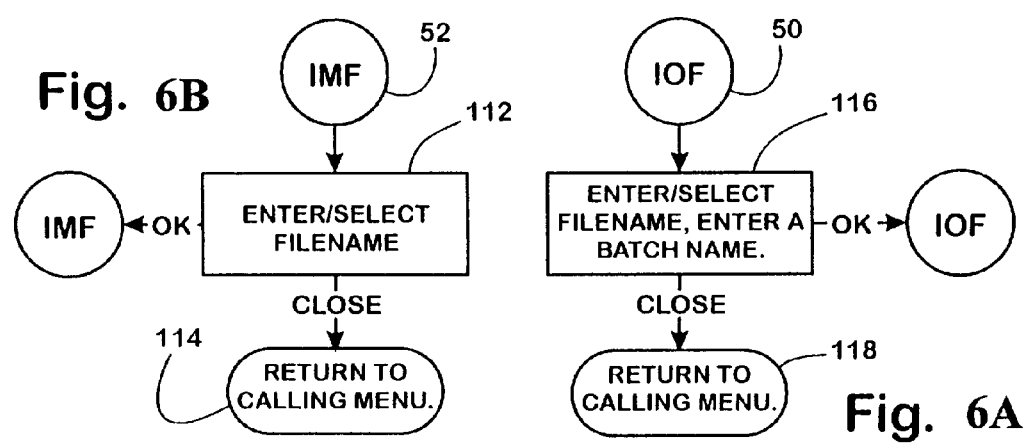
Fig. 6B
Fig. 6A

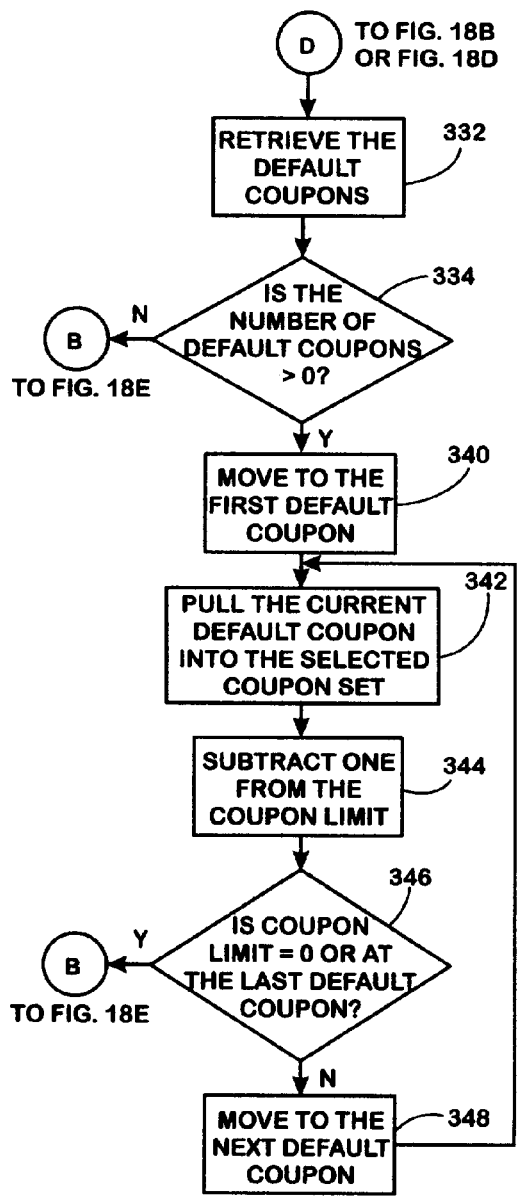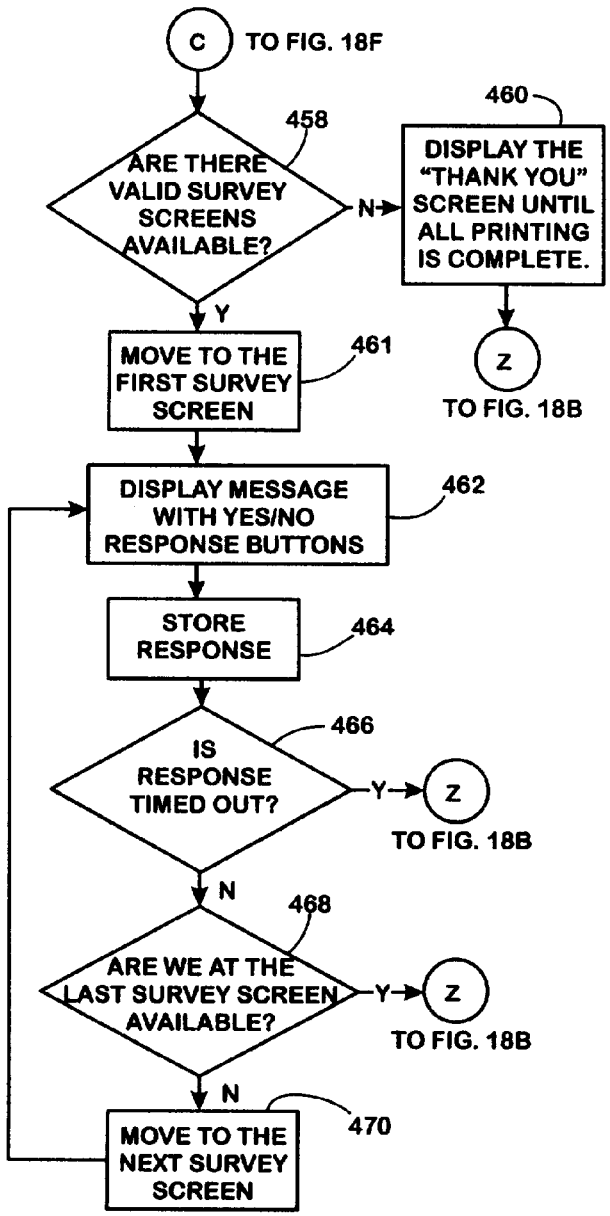
Fig. 18G
Fig. 18H

COUPON DELIVERY SYSTEM

CROSS-REFERENCE TO RELATED APPLICATIONS

This application is a continuation-in-part of application Ser. No. 08/470,224 filed Jun. 6, 1995, abandoned, which is a continuation-in-part of application Ser. No. 08/316,909 filed Oct. 3, 1994 now U.S. Pat. No. 5,822,735, which is a continuation of application Ser. No. 07/947,285 filed Sep. 17, 1992, now U.S. Pat. No. 5,353,218.

BACKGROUND OF THE INVENTION

This invention relates generally to computer systems and methods for generating coupons to provide discounts for purchases and, in particular, to delivery techniques for delivering coupons assigned to a particular household. The invention is particularly adapted for delivering targeted coupons to a household. Targeted coupons are coupons which are assigned to a household on the basis of attributes of that household.

Retail establishments, in particular grocery establishments, have attempted to use various technologies to assist in increasing sales at its stores, or retail outlets. One technique is to provide rewards in the form of discounts to regular customers who purchase significant amounts from that chain. This led to a frequent shopper system in which point-of-sale, or checkout, systems are used in conjunction with frequent shopper cards in order to provide instant discounts to customers presenting a frequent shopper card to the cashier. Such frequent shopper card may be bar-coded, wherein the identity of the household possessing the card may be scanned with the bar code scanner used to input purchases to the point-of-sale system. One difficulty with such instant discounts is that they are provided to every customer who presents a frequent shopper card to the cashier. This invites "cherry picking" in which certain customers obtain frequent shopper cards from multiple chains and plan purchases in order to purchase items from each chain which are discounted. Such "cherry picking" reduces the profit margin of the retail establishment, which, particularly for grocery establishments, tends to be low to begin with.

In order to discourage such "cherry picking," computer systems have been developed which take the discounting function away from the point-of-sale system, which is inflexible and must provide discounts to all parties possessing a frequent shopper card and, instead, utilize information obtained by the point-of-sale system in order to target coupons to particular households. In one such system, households are divided into clusters, such as deciles, according to the amount of purchases made by each household in a given period of time. Thus, infrequent shoppers would fall in the first decile, more frequent shoppers in the second decile, and the like, with shoppers doing the heaviest purchasing falling in the tenth decile. The targeting system then assigns coupons to particular households based upon the cluster, or deciles, in which that particular household is situated. In this manner, all households in a particular cluster, or decile, are assigned the same coupons. However, households in one decile may be assigned coupons different from households in a different decile. Each coupon assigned to a household represents a negative price or "cents off" value. A print file is generated by the targeting system and forwarded by the retail establishment to a commercial printer. The commercial printer prints, folds, and mails to each household the coupons assigned to that household based upon the output print file of the targeting system. Each of the coupons typically includes a bar code, or other coding technique, which is scanned at the point-of-sale system and provides a pointer to a location in a product lookup (PLU) table. The PLU table contains a listing of negative prices, or discounts, which are applied to the total purchase when the coupon is redeemed. The targeted coupon typically includes a text field made up of, for example, three lines of text, which describes an offer statement for that coupon. The offer statement may be, for example, a number of cents off of a particular item, buy-one get-one free, $5 off of $50 of purchases, and the like. In addition to the offer statement, the text field includes any information with respect to an expiration date of the coupon. As a result, substantially the entire text field is typically devoted to describing the offer statement and expiration information. Any additional information must be squeezed into any remaining portions of the text field that are not used by the offer statement and expiration information.

The targeted coupon print file is typically sent by the retail establishment to the commercial printer periodically, such as every month, every two months, or the like. All of the targeted coupons assigned to a household are printed on sheets, with multiple coupons on a sheet. Therefore, the number of coupons assigned to each household is fixed. Once the coupons are printed, folded, and inserted in an envelope, the coupons are mailed typically utilizing bulk mail rates. The printing and mailing process is relatively expensive. Therefore, it is typical for the retail establishment to exclude all but the highest level clusters, or deciles, from the system. Therefore, infrequent shoppers are not mailed coupons. The households which do receive coupons may receive them up to approximately two (2) weeks after printing because of the delays inherent in bulk rate tariffs.

Such mailed targeted coupon system has many drawbacks. In addition to the high costs, which limit the number of frequent shoppers who receive coupons, the delay in the cycle between assigning coupons to households and the receipt of those coupons in the mail by the households, often results in the coupons either already being expired when they arrive or the merchandise discounted by the coupons no longer being available from the manufacturer resulting in the necessity to hand out rain checks. The coupons are often delivered to households on vacation or who have changed addresses, resulting in wasted production and mailing costs, as well as the creation of additional junk mail which must be discarded. The lengthy planning cycle of assigning coupons to households and printing and mail delivery of the coupons to the households precludes responding to any fast changes in market conditions. Furthermore, receipt of the coupons in the mail greatly diminishes any impulse-buying because of delay between the time the household receives the coupons and the next shopping trip to the issuing retail establishment.

Although the mailing of targeted coupons to a household could provide the opportunity for directing specific information to the household, the mailed targeted coupon packets are not utilized for that purpose. Because of the excessively long planning cycle, it is not feasible to utilize mailed targeted coupon packets to inform the households of information which changes frequently. They additionally do not provide an opportunity for dialog with customers of the retail establishment. Furthermore, customers get coupons without requesting them, which may further reduce the impact that the coupons have on the purchasing habits of the household.

Retail establishments, such as grocery stores, often develop promotional campaigns designed to encourage increased purchases among its frequent shopper members. An example of such a campaign is a program which gives away a valuable item, such as a turkey or ham, to a frequent shopper member who purchases a given amount of merchandise within a predefined period of time. While such a campaign has proven successful at increasing purchases by frequent shoppers, it can create administrative difficulties. One difficulty is that members desire to keep track of their qualifying accumulated purchases in order to gauge how much additional purchases must be made to qualify for the prize. This desire for information increases as the cutoff date for the qualifying period approaches. In order to learn their accumulated purchase value, households tend to approach the customer service counter resulting in an increased distraction to customer service personnel, especially as the campaign deadline approaches.

SUMMARY OF THE INVENTION

The present invention provides a computer system and method which generates coupons to provide discounts for purchases which is efficient, flexible, and dynamic and which is capable of increasing profit margins of the participating retail establishment. Such computer system not only generates and dispenses targeted coupons, which are assigned to particular households on the basis of at least one attribute of that household, it also has the capability of enhancing a dialog between a retail establishment and its customers.

A computer-implemented method of generating coupons to provide discounts for purchases, according to an aspect of the invention, includes providing a computer-based kiosk at a retail establishment. A user identification of a household is received at the kiosk. The kiosk outputs a series of targeted coupons which have been assigned to the individual household on the basis of at least one attribute of that household. Because the coupons are dispensed by a kiosk at the retail establishment, a very short planning cycle, between assigning of the coupons to the particular households and the availability of the coupons to the households, is provided. This short of planning cycles makes the kiosk dispense coupons more responsive to market conditions. For example, a notification by the manufacturer that a promotional discount program is being terminated as a result of lack of availability of merchandise, can be immediately responded to by disabling of the associated coupon offers. Additionally, items which are subject to rapidly changing market conditions, such as fresh produce and direct store delivery items, can be discounted, according to the invention, because coupon offers can be created or changed frequently, even daily, if desired. Advantageously, coupons are provided to a household by the kiosk only upon request by the household user who obtains coupons assigned to that household by entering a user identification at the kiosk, such as by passing a frequent shopper card past a scanner or the like. This avoids the problem of coupons being mailed to an incorrect address or to a household on vacation. Coupons may be available to users based upon user's frequency of shopping rather than a fixed mailing cycle. Indeed, coupon assignments may be "stacked up" for households so that a coupon assignment is always ready even for households that make frequent shopping trips. Furthermore, the shorter planning cycle ensures that coupons will not be delivered to households at, or beyond, the expiration date. If coupons in a coupon assignment are at or near the expiration date when the user requests coupons from the kiosk, the expired or about-to-expire coupons can be deleted.

According to a more-detailed aspect of the invention, a computer-implemented method of generating coupons to provide discounts for purchases includes providing a computer coupon database and a computer household database. The coupon database includes a plurality of coupon records, each providing a definition of a coupon offer. The household database includes a plurality of household records, each providing at least one attribute of a particular household. A record for a particular household is retrieved from the household database and at least one targeted coupon is assigned to the particular household. The targeted coupon is selected from the coupon database as a function of an attribute of that household in the household record for that household. Assignment of targeted coupons to households may occur remotely from the kiosk, or kiosks, with a communication link, such as a local area network or a wide area network utilized to link the kiosk, or kiosks, with the computer assigning the targeted coupons which may, for example, be a network server. When a user household is identified at one of the kiosks, any coupons assigned to the identified household are formatted and outputted by the kiosk.

This formatting of coupons assigned to a household in response to receipt of the user identification of the particular household may be accomplished, according to another aspect of the invention, by including in each coupon record an identification of an offer type and at least one offer value. An image of an offer statement is formatted for each of the coupons assigned to the identified household as a function of the offer type and the at least one offer value. Advantageously, such offer statement, such as a given number of cents off of a particular product, two for the price of one, or the like, may be placed at a prominent place on the coupon separate from text field. This allows the text field to be utilized for additional information regarding the particular offer. For example, a particular item may be identified in the text field to which a buy-one get-one free offer applies. The formatted coupon may additionally include an expiration statement separate from the test field. The image of the expiration statement is formatted from information contained in a validity date field on the coupon record. Likewise, any text to be applied to the coupon is in a separate text field. By formatting images coupons "on the fly" from parameters set forth in a coupon record, coupon offers can be created and modified readily without a requirement for mass storage of a coupon image.

According to another aspect of the invention, at least one triggered coupon may be assigned to a particular household. The triggered coupon is selected by the computer from the coupon database, based upon an attribute of that household, and assigned to that household. When the user is identified at the kiosk, the user is prompted to select whether the user wishes to receive the triggered coupon, or not. If the user indicates a wish to obtain the triggered coupon, the triggered coupon is formatted and outputted by the kiosk. This aspect of the invention is especially useful with promotional programs that award coupons for large items to the user. The triggered coupon is only generated when the user qualifies for the item. However, the coupon is not automatically generated in response to identification of the user at the kiosk. Rather, the user is allowed to decline receipt of the triggered coupon at that time. When the user, again, accesses the kiosk, or another kiosk, at a later date, the consumer will, again, be notified that a triggered coupon is available and allowed to determine whether to receive the triggered coupon at that time, or not.

According to another aspect of the invention, the kiosk is capable of formatting messages which incorporate key words. The key words are derived from an attribute of the household from the household file for the user identified at the kiosk. This not only allows messages to be personalized to the particular user, but also allows specialized communication with the user. For example, the user may be notified of the accumulative purchases made by that user for the purposes of an award program. This allows the user to remain apprised of the amount of purchases necessary in order to receive the award without the necessity for the user being serviced at the customer service counter. This greatly enhances the productivity of customer service personnel. The messages may be displayed on a display device, such as a TV monitor, or may be printed and dispensed with the coupons. Other messages may be displayed to the user, such as a greeting message, a survey prompting series of questions, and the like.

According to another aspect of the invention, the number of coupons dispensed to particular households may be set at a particular number which may vary from household to household. This allows the system to vary the number of coupons assigned to a household as a function of attributes of the household, such as accumulative purchases by that household. In this manner, the heaviest shoppers may be awarded more coupons than less frequent shoppers. Coupons assigned to each household may include not only targeted coupons, but also mandatory coupons which are assigned to all households. Mandatory coupons are typically provided by manufacturers and assigned to the households prior to assignment of any targeted coupons. If the mandatory coupons and targeted coupons to do not fill the coupon number allotted to that household, default coupons may be assigned to that household until the assigned number is reached.

A coupon-generating system, according to an aspect of the invention, includes a computer system defining a computer database and a household database. The coupon database includes a plurality of coupon records, each providing a definition of a coupon offer. The household database includes a plurality of household records, each providing at least one attribute of a particular household. The computer system is programmed to assign at least one coupon from the coupon database to a particular household as a function of at least an attribute of that household. One or more computer-based kiosks are provided, each having a user identification device, a display device, and a printer, and all are controlled by a computer. Each kiosk computer is programmed to format images of coupons assigned to a particular household and to output the coupon images in response to the user identification device receiving a user identification of a particular household. The computer system is preferably a network server interconnected with a plurality of kiosks by either a local area network or a wide area network. If the communication link between one or more of the kiosks and the computer system is non-functional, the kiosk computer is programmed to format images of a set of default coupons. This allows users to receive coupons from the kiosk even if the network server or network is non-functional, in order to avoid disappointment to the customer. The coupon-generating system may additionally include at least one point-of-sale system having a scanner device and a point-of-sale computer. The point-of-sale computer is responsive to codes scanned by the scanner device in order to provide data which is fed to the computer system in order to determine at least in part the attribute, or attributes, of the household identified at the point-of-sale computer. The scanner preferably also provides for scanning of coupons printed by the kiosk.

The system is additionally capable of dispensing coupons to new members who may be added to the system by responding to questions prompted at the kiosk followed by dispensing of a default selection of coupons to that user. This provides an instant reward for becoming a frequent shopper member of the retail establishment.

These and other objects, advantages, and features of this invention will become apparent upon review of the following specification in conjunction with the drawings.

BRIEF DESCRIPTION OF THE DRAWINGS

FIG. 5 is a flowchart of an import file definition program;

FIG. 6A is a flowchart of an import offer file program;

FIG. 6B is a flowchart of an import miscellaneous files program;

FIGS. 18A–18H are a flowchart of a kiosk coupon-delivery program;

DESCRIPTION OF THE PREFERRED EMBODIMENT

Figure 1:
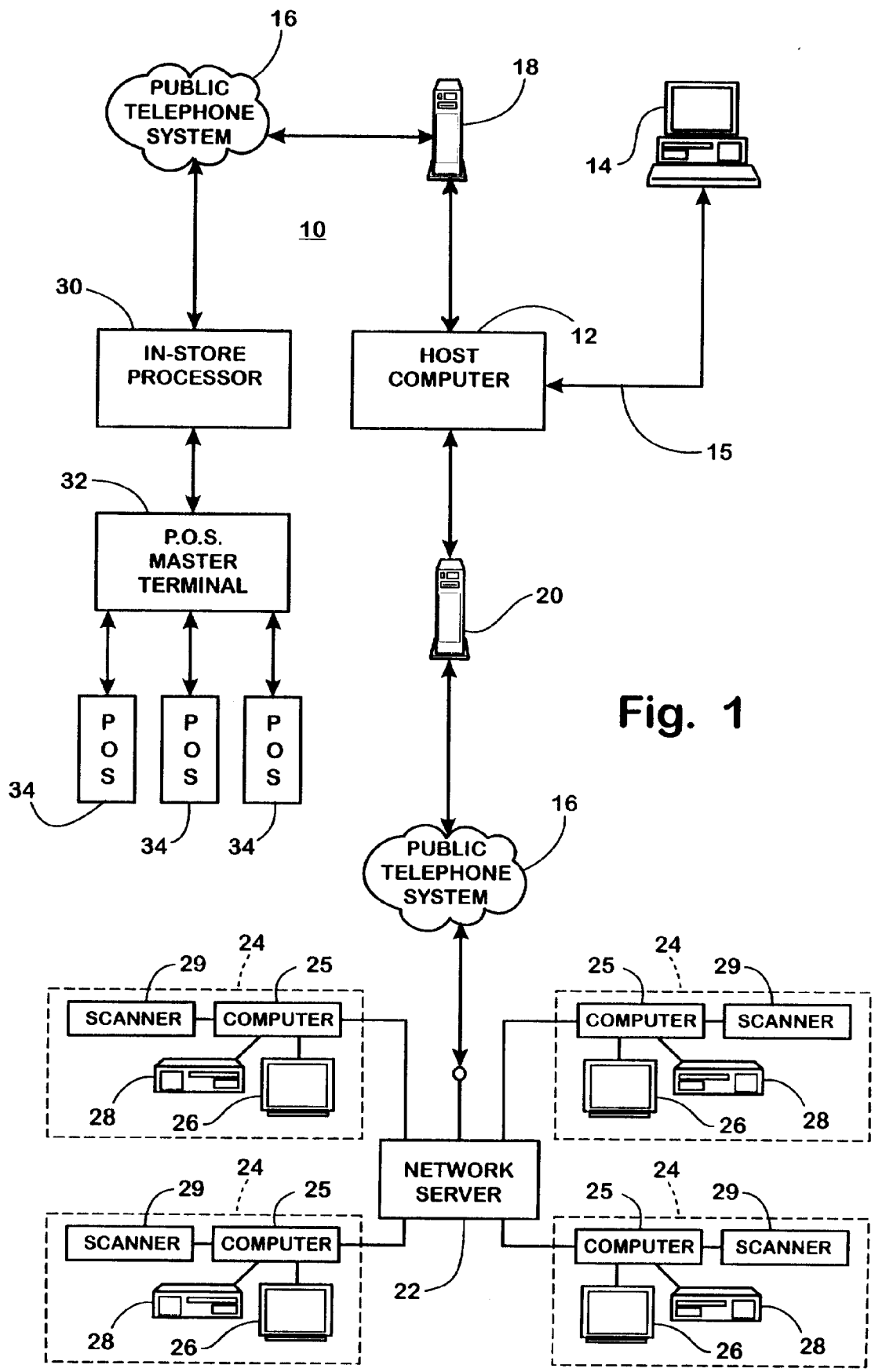
FIG. 1 is a hardware block diagram of a computer-generating system useful with the invention.

Referring now specifically to the drawings, and the illustrative embodiments depicted therein, a coupon-generating system 10 may be organized around a host computer 12 which maintains a coupon database of coupon offer records, a household database of member households, and software which performs numerous functions including assigning coupons to particular households (FIG. 1). Host computer 12 may be located on the premises of one of the retail outlets of the retail chain utilizing the coupon-generating system or may be located at a headquarters operation or at another remote site. Coupon-generating system 10 includes a coupon management computer 14 which is utilized by a system operator of the retail chain to enter in the system various system parameters, as will be described in more detail below. Data files on computer 14 may be communicated over any convenient communication system link 15 to host computer 12. A network server 18, typically located at the same premises as host computer 12, receives coupon offer records and communicates the records over a communication link, such as public telephone system 16, or a leased line, or the like, to an in-store processor 30. In-store processor 30 communicates with a point-of-sale master terminal 32, which, in turn, communicates with a plurality of point-of-sale terminals 34. Host computer 12 downloads to in-store processor 30 files of valid coupon records, including a coupon identification code assigned to each coupon record. Each point-of-sale terminal 34 supports a scanner (not shown), such as a bar code reader, in order to scan codes, such as a one-dimensional or two-dimensional bar code, on merchandise packages and on coupons. Point-of-sale master terminal 32 maintains a database of coupon records and product codes in order to decode the data scanned through each terminal 34 and thereby construct a transaction set. Each transaction set may include products purchased by a consumer, total value of a transaction, and each coupon redeemed by a consumer. Each transaction set is associated with a particular purchasing entity, such as a user household, and is uploaded through in-store processor 30 to host computer 12. The transaction set may be associated with a particular purchasing entity by any means for entering the identity of the purchasing entity in POS terminal 34, such as by scanning a machine-readable user identification code provided on a frequent shopper card. Alternatively, POS terminal 34 may identify the purchasing entity by scanning a combined coupon identification and household identification bar code on a coupon as disclosed in U.S. Pat. No. 5,353,218 issued to James P. DeLapa et al. for a FOCUSED COUPON SYSTEM, the disclosure of which is hereby incorporated herein by reference. Alternatively, POS terminal 34 may identify the purchasing entity by scanning a machine-readable user identification code provided on a personalized shopping list of the type disclosed in commonly assigned Laid-Open Canadian Patent Document 2,193,869, laid-open Jun. 23, 1998,by DeLapa et al. for a COMPUTER-IMPLEMENTED METHOD AND APPARATUS FOR IDENTIFYING PRODUCTS THAT ARE OF LIKELY INTEREST TO PURCHASERS IN A RETAIL ESTABLISHMENT, the disclosure of which is hereby incorporated herein by reference.

Another network server 20 physically located with host computer 12 receives files containing targeted coupons generated by host computer 12. Network server 20 passes the targeted coupon records on through a communication link, such as public telephone system 16, or a leased line, or the like, to an in-store controller, such as a network server 22 located in a retail outlet of the retail chain. In-store controller 22 may be a network server which provides communication with a plurality of kiosks 24 located within the retail outlet. Network servers 18 and 20 may be separate units or may be combined in a single unit and may be combined with host computer 12.

Each kiosk 24 includes a kiosk computer 25, a display device, such as a touch-screen monitor 26, which is capable of displaying messages to the user and receiving input selections from a user, a printer 28, which prints coupons, and a user identification device, such as a scanner 29, which identifies users. In the illustrated embodiment, scanner 29 scans the bar code on a frequent shopper card, the bar code being unique to a particular household to whom the card has been issued. However, alternate means may be provided to identify the user/household, such as by receiving an identification number, such as a telephone number through touch screen 26, a magnetic strip reader, an optical character recognition reader, a Smart Card reader, a voice recognition device, a handprint recognition device, a mechanical keypad, or any such device capable of providing user identification. In the illustrated embodiment, kiosk 24 is a commercially available kiosk marketed by Kiosk Information Systems, Inc., located in Broomfield, Colo. Scanner 29 is a commercial scanner marketed by Symbol Technology, Inc., printer 28 is a commercially available printer marketed by Magnateck, and touch screen 26 is a commercially available monitor marketed by Magnavox. However, as will be described in more detail below, kiosk computer 25 is programmed with additional software which formats coupon images as well as formatting various messages and the like for communication with the user. Kiosk computer 25 is programmed with software supplied with kiosk 24 in order to control the components of the kiosk in a coordinated fashion. The software is provided with the kiosk and is proprietary to Kiosk Information Systems, Inc. Kiosk computer 25 is an IBM PC-compatible computer supplied by Gateway Computer Corporation having a Pentium processor marketed by Intel Corporation.

Although, in the illustrated embodiment, host computer 12 is illustrated as communicating with the network server in each retail outlet through the public telephone system, a wide area network or other dedicated communication link may be utilized. Additionally, especially in a single outlet establishment, the functions of host computer 12 may be carried out in the network server 22 for that establishment. The particular hardware configuration is outside the scope of the present invention and may be selected by the skilled artisan according to the particular application.

Figure 2:
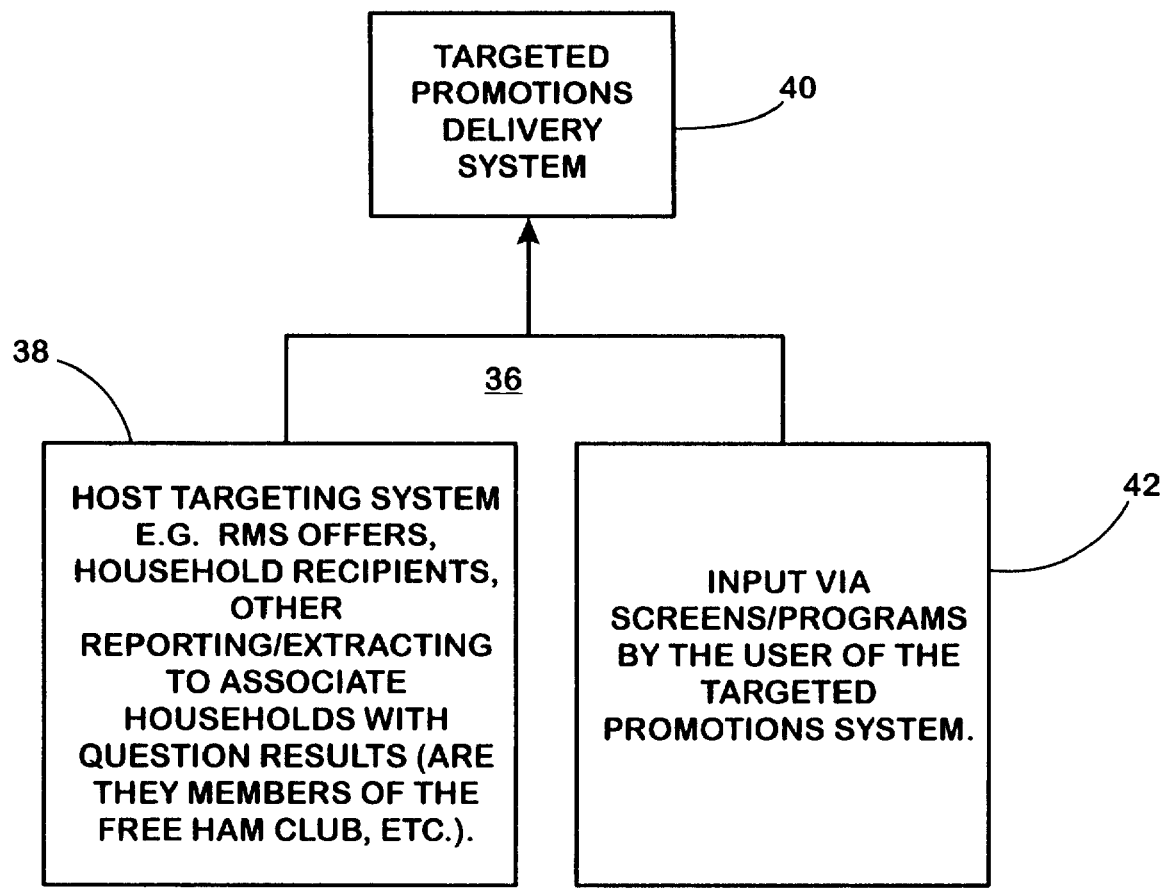
FIG. 2 is a block diagram of an embodiment of a computer-generating system according to the invention.
Figure 3:
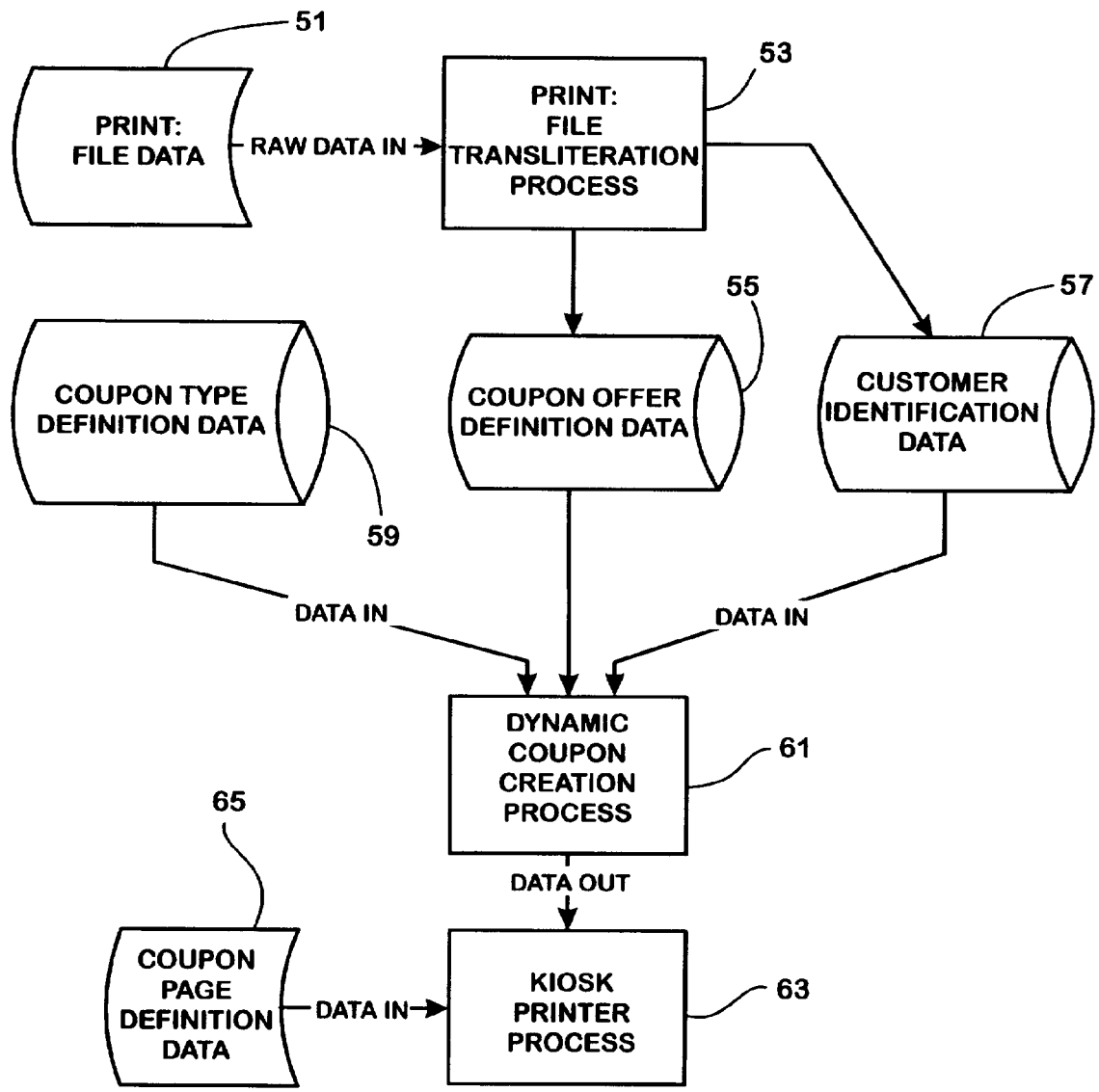
FIG. 3 is a block diagram of a computer-implement method of generating coupons according to the embodiment in FIG. 2.

A coupon-generating system 36 according to the invention, in the illustrated embodiment, utilizes a targeting system 38 of the type marketed by RMS Corporation located in Stamford, Connecticut (FIGS. 2 and 3). The host-targeting system resides on host computer 12 and receives inputs from in-store processor 30 and management computer 14 in order to establish a coupon offer definition database 55, a household database 57 of frequent shopper members and particular attributes regarding that household. Such attributes tracked in the host tracking system may include accumulative purchases by that household within a particular period of time, whether the household is a member of a particular promotional campaign, and the like. A coupon offer database and household database are established in database software marketed by Microsoft, Inc., located in Redmond, Wash. under the brand name SQL Server. Host-targeting system 38 is programmed to assign coupon offers to particular households based upon an attribute of the household. In the illustrated embodiment, the attribute utilized for assigning coupons is the decile of accumulative purchases by the household within a given period of time. Coupons are assigned to households based upon the household decile and coupon-assigning parameters entered through management computer 14. Coupons are assigned using techniques specific to the targeting system but may be assigned using the method disclosed in the DeLapa et al. co-pending application Ser. No. 08/470,224 filed Jun. 6, 1995. Host-targeting system 38 produces a print file 51 containing information regarding the coupons assigned to each household, including details on the coupon offer. The print file produced by targeting system 38 is conventionally supplied by the retail establishment or chain to a commercial printer in order to print, fold, and mail coupons to households. According to the present invention, the print file of host-targeting system 38 is provided to a targeting promotion delivery system 40 which transliterates the print file at 53 in order to arrange the data in a format which facilitates further processing in a manner which will be described below. Coupon-generating process 36 further includes an enhancement module 42, which receives, via input screens, various setup information to augment that produced by host-targeting system 38. This includes a database 59 of coupon types. Coupons are formatted at a kiosk 24 "on the fly," utilizing a dynamic coupon creation process 61, in a manner which will be described in more detail below. The kiosk prints the dynamically formatted coupons at 63 utilizing coupon page definition data in a database 65. Coupon definition database 59 and coupon page definition database 65 are established in database software marketed by Microsoft Corporation located in Redmond, Washington under the brand name Access.

The benefit of the coupon-generating method process, as illustrated in FIGS. 2 and 3, is that it utilizes the existing host-targeting system installed on the retail chain's host computer. Alternatively, the function of host-targeting system 38 and enhancement system 42 may be provided according to the principles disclosed in U.S. Pat. No. 5,353,218 issued to DeLapa et al. for a FOCUSED COUPON SYSTEM and co-pending U.S. patent application Ser. No. 08/470,224 filed Jun. 6, 1995, by DeLapa et al. for a COMPUTER-IMPLEMENTED METHOD AND APPARATUS FOR IDENTIFYING PRODUCTS THAT ARE OF LIKELY INTEREST TO PURCHASERS IN A RETAIL ESTABLISHMENT, the disclosures of which are hereby incorporated herein by reference (hereinafter commonly referred to as the "focused coupon system"). The focused coupon system may assign targeted coupons to households on the basis of attributes of the household which are dynamically developed and maintained by the focused coupon system. Such attributes may be determined initially by a consumer survey in order to obtain basic information regarding the household. Thereafter, household attributes are dynamically updated by monitoring which targeted coupons the household redeems and which targeted coupons the household does not redeem. The focused coupon system may additionally take into account other data in updating the household attributes, such as accumulative purchases, purchases of particular items, item categories, and the like. It should be understood that the term "targeted coupon" applies to any technique which assigns a coupon to a household based upon any attribute of that household.

Because host-targeting system 38 is commercially available, it will not be described in detail herein. Suffice it to say, host-targeting system 38 produces for each offer a basic offer description, text, bar code, and a single value stating the number of cents the offer is valued at. Enhancement system 42 provides the ability to define each coupon offer as a targeted coupon, a default coupon, or a mandatory coupon, as will be described in more detail below. Enhancement system 42 additionally provides the ability to enable and disable coupon offers individually. Enhancement system 42 additionally provides the ability to create printable messages targeted at particular households, including key words which are generated as a function of particular attributes of the household, as will be explained in more detail below. Enhancement system 42 additionally creates screen messages for greeting, informing, thanking, and surveying customers. Enhancement system 42 additionally controls, for each particular household, the number of coupons that may be received by that household for each visit. In the illustrated embodiment, the number of coupons that may be received by each household with each visit is preferably a function of accumulative purchases by the household within a particular period of time. However, other factors may be included in establishing the number of coupons which the household may receive with each visit, including the frequency of visits by that household, the time since the last visit, and the like.

Other functions performed by enhancement module 42 include developing and appending an offer type and its constituent parameters, as will be described in more detail below, and a valid data range. The enhancement system 42 additionally provides the capability of defining an offer as a triggered coupon offer which provides the user with the ability to choose whether to receive the offer at that time or not. The enhancement system may additionally provide the ability to limit the number of times a household may receive a given offer. Additionally, enhancement system 42 may provide various administrative-reporting functions, such as reporting what offers were given to which households, as well as responses of households to survey questions, and the like.

Figure 4:
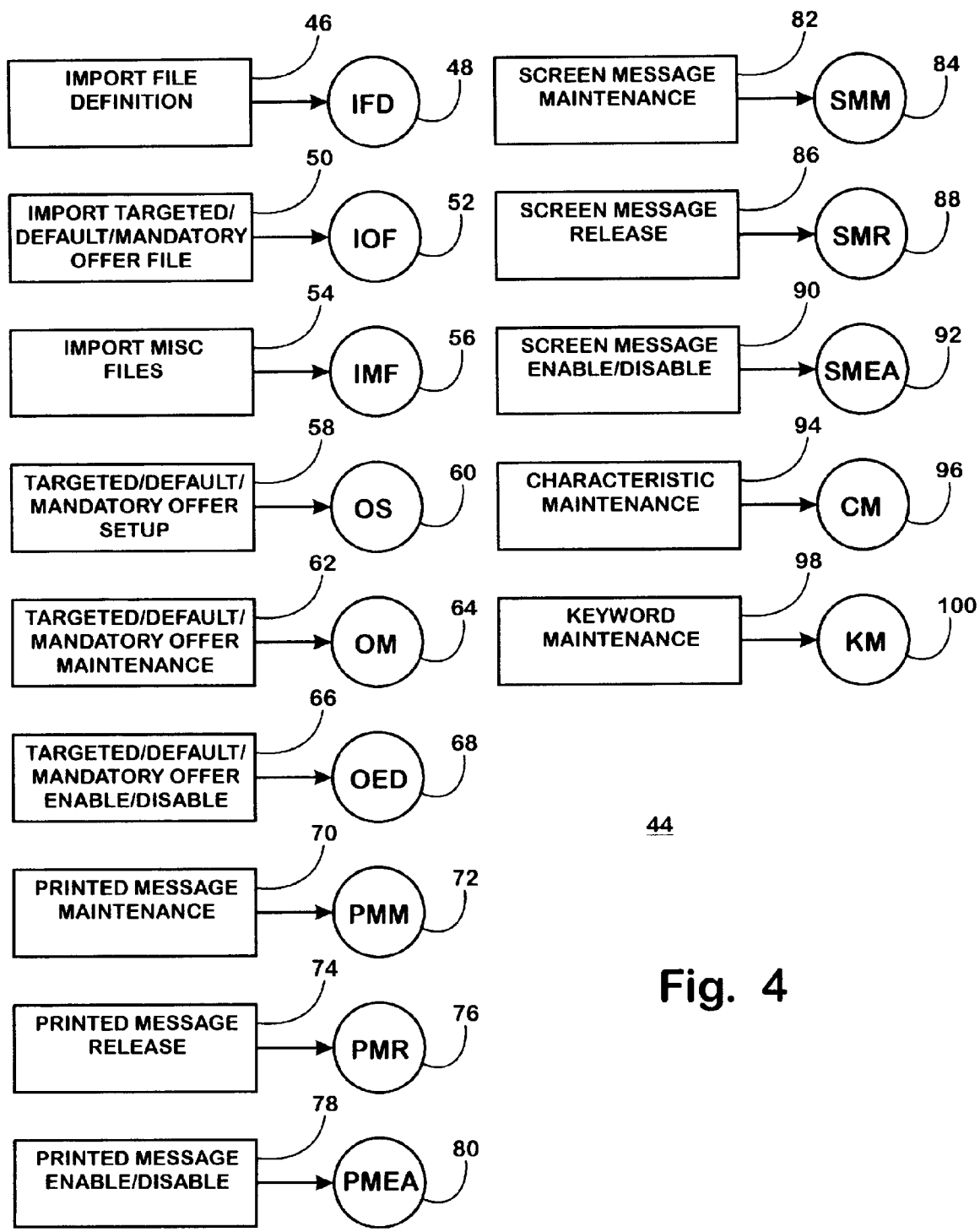
FIG. 4 is a flowchart illustrating a calling screen program.

Enhancement system 42 provides a facility to transliterate extracted data from offer-targeting system 38 into a form where it may be supplemented with data for further targeting and delivery of the coupon by a kiosk 24. In order to accomplish this function, enhancement system 42 includes a menu selection calling program 44 which displays on management computer 14 a menu of system management functions which may be selected by the system operator (FIG. 4). Menu selection program 44 provides an import file definition selection 46, which calls an import file definition program 48; an import-targeted/default/mandatory offer file selection 50, which calls an import offer file program 52; an import miscellaneous file selection 54, which calls an import file program 56; a targeted/default/mandatory offer setup selection 58, which calls an offer setup program 60; a targeted/default/mandatory offer maintenance selection 62, which calls an offer maintenance program 64; a targeted/default/mandatory offer enable/disable selection 66, which calls an offer able/disable program 68; a printed message maintenance selection 70, which calls a printed message maintenance program 72; a printed message release selection 74, which calls a printed message release program 76; a printed message enable/disable selection 78, which calls a printed message enable/disable program 80; a screen message maintenance selection 82, which calls a screen message maintenance program 84; a screen message release selection 86, which calls a screened message release program 88; a screen message enable/disable program 90, which calls a screen message enable/disable program 92; a characteristic maintenance selection 94, which calls a characteristic maintenance program 96; and a key word maintenance selection 98, which calls a key word maintenance program 100. After a program is called from menu selection call program 44, control returns to the menu selection after completion of the function by the system operator.

The import file definition function 48, which is called by import file definition selection 46, allows the operator to set up the enhancement system so that the system knows how to interpret files imported from the host-targeting system and to organize the file definitions in a manner suitable to the operator (FIG. 5). The import file definition function determines which fields in each record go in the enhancement system. When selected, import file definition program 48 prompts the user to select an import-type and the file name to be imported at 102. The import type is selected from: (a) card number to household affiliation files, (b) coupon files, (c) household-triggering coupon files, (d) household characteristic files, (e) household key word value files, and (f) coupon dispense limit files. If only one import type is selected, the program prompts the user at 104 to enter the start and length of each column in the incoming record and a corresponding column that the data is to be applied in a table being constructed by the operator. Some files have multiple records. If multiple record types are selected at 102, the operator is prompted at 106 to match a table with each record type and enter a value for each record type that defines the record type. For the first file, the format is edited at 108 by entering the start and length of each column in the incoming record and the corresponding column in the table being constructed by the operator in which that data is to be placed. After the operator is satisfied, the program then returns to 106 for selection of the next file to be processed. After the operator has imported and formatted all of the desired import files, the program returns to calling menu 44 at 110.

When the import offer file program is selected by the operator choosing the import targeted/default/mandatory offer file selection, the operator is provided with the tools to import coupon offer files by entering or selecting a file name at 112 (FIG. 6A). The operator is additionally prompted to identify coupons by batch and to assign a name to the batch at 116. Batches allow the operator to subsequently process offers in batches which are set up for the convenience of the operator, such as by store assignment or the like. When the operator is completed with importing coupon offer files, control returns to the calling menu 44 at 114. When the operator chooses the import miscellaneous file selection 54, a function is selected which allows the operator to import other files by entering a file name or a batch name at 116 (FIG. 6B). When the operator has imported all of the files desired, control returns to the calling program 44 at 118.

Figure 7:
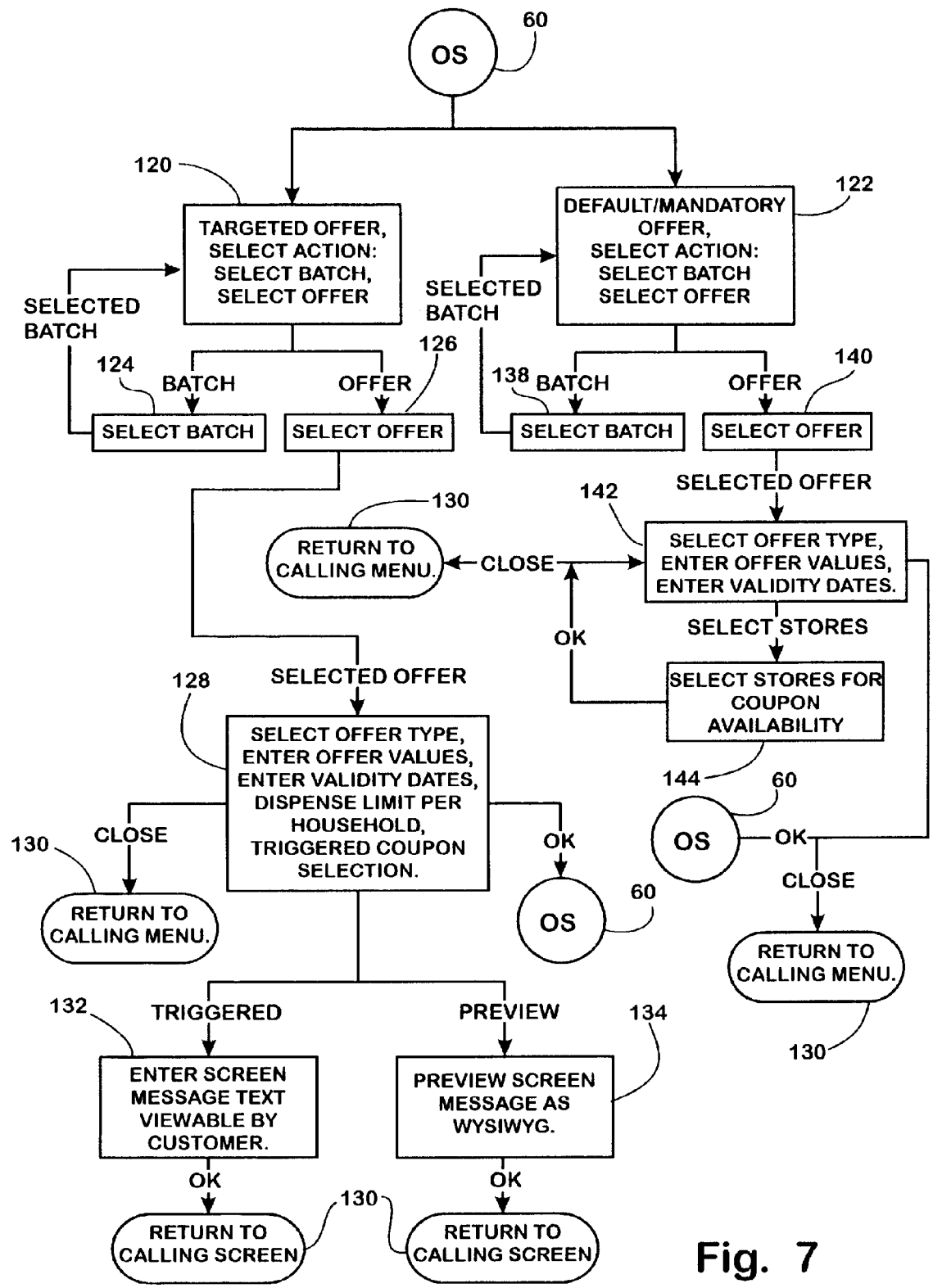
FIG. 7 is a flowchart of an offer setup program.

After the operator has defined and imported all of the necessary files from the host-targeting system, the operator may then choose functions which allow the operator to set up the offers. This may be accomplished by choosing the offer setup function 60 using targeting/default/mandatory offer-setup selection 58, which prompts the operator to select between processing a targeted offer at 120 or processing default and mandatory offers at 122 (FIG. 7). Targeted offers are coupons which are assigned to a household on a basis of an attribute of the household. In a host-targeting system supplied by RMS, the attribute of the household is the accumulative purchases by that household at the retail establishment. In a host-targeting system supplied according to the teachings of the DeLapa et al.'218 patent, the attribute of the household may be related to the makeup and ages of the family, presence or absence of particular types of pets, and the like. Such attributes may be determined initially from a household survey and updated as a result of coupons issued to that household which the household either redeems or does not redeem. However, other attributes may be utilized. These may include, for example, particular items which are purchased by the household, or categories of items purchased by the household, such as laundry soap, ketchup, and the like, without regard to the particular brand, size, or the like, as disclosed in the DeLapa et al. pending patent application for a COMPUTER-IMPLEMENTED METHOD AND APPARATUS FOR IDENTIFYING PRODUCTS THAT ARE OF LIKELY INTEREST TO PURCHASERS. Other targeting schemes will suggest themselves to those skilled in the art. Default offers are coupons which are assigned to all customers of a particular store or outlet. Default offers may additionally include coupons issued by the kiosk when communication between host computer 12 and kiosks 24 is malfunctioning. Default offers may additionally provide coupons to newly added members which have not yet established an attribute in their household record. Default offers may additionally be provided to make up for the difference between the number of coupons assigned to a household and the total number allowed for that household after the mandatory and targeted offers are assigned. Mandatory offers are coupons that are assigned to all recognized households or all households of a particular retail outlet.

If the targeted offers are to be processed at 120, the operator is prompted to determine which action is desired from a group of possible actions including: (a) selecting an offer type, (b) entering offer values, (c) entering validity dates, (d) limiting the number of times a coupon can be dispensed per household, and (e) designating the coupon as a triggered coupon. The operator is also prompted to select a batch of coupons and an offer from the selected batch. If the operator selects a batch to process, the operator is prompted to identify the batch at 124, which returns the program to 120, in order to select the first offer to process. The offer is selected at 126 and parameters for the selected action are entered at 128. If additional offers or batches require processing, control returns to the offer setup menu at 60 for further processing. If all offers are processed, then control is returned to calling menu 44 at 130.

A triggered offer is an offer that is targeted to a household based upon an attribute of a household. However, when the kiosk receives an identification of that household, the kiosk will display a message on the screen with a YES/NO button in order to allow the user to choose whether to receive the offer or not. If the user chooses to receive the offer, the coupon will be dispensed at that time. If the user chooses to not receive the offer, the offer will remain targeted to that household and the household will be prompted the next time that household is identified in a kiosk as to whether the user wishes to receive the targeted offer. If the selected action is to designate a coupon as a trigger coupon, the operator is prompted at 132 to enter a screen message text which is viewable by the customer. The screen message may then be previewed at 134 by the operator. Control returns to the calling program at 130.

If the operator chooses to set up default/mandatory offers at 122, the operator is prompted to identify a batch at 138 and an offer within the selected batch at 140. For the selected offer, the operator is prompted to enter an offer type, offer values, and validity dates at 142. The offer type would be selected from a field of offer types, such as cents off with this coupon, cents off for a particular minimum purchase level, a number of free articles with the purchase of another number of same articles, and the like. After the operator has selected the offer type, offer values, and validity dates at 142, the operator is prompted to select stores, or outlets, of the chain to which the selected offers are to be made available at 144. The operator may then return to the main menu 60 for offer setup or may return to the calling menu at 130.

Figure 8:
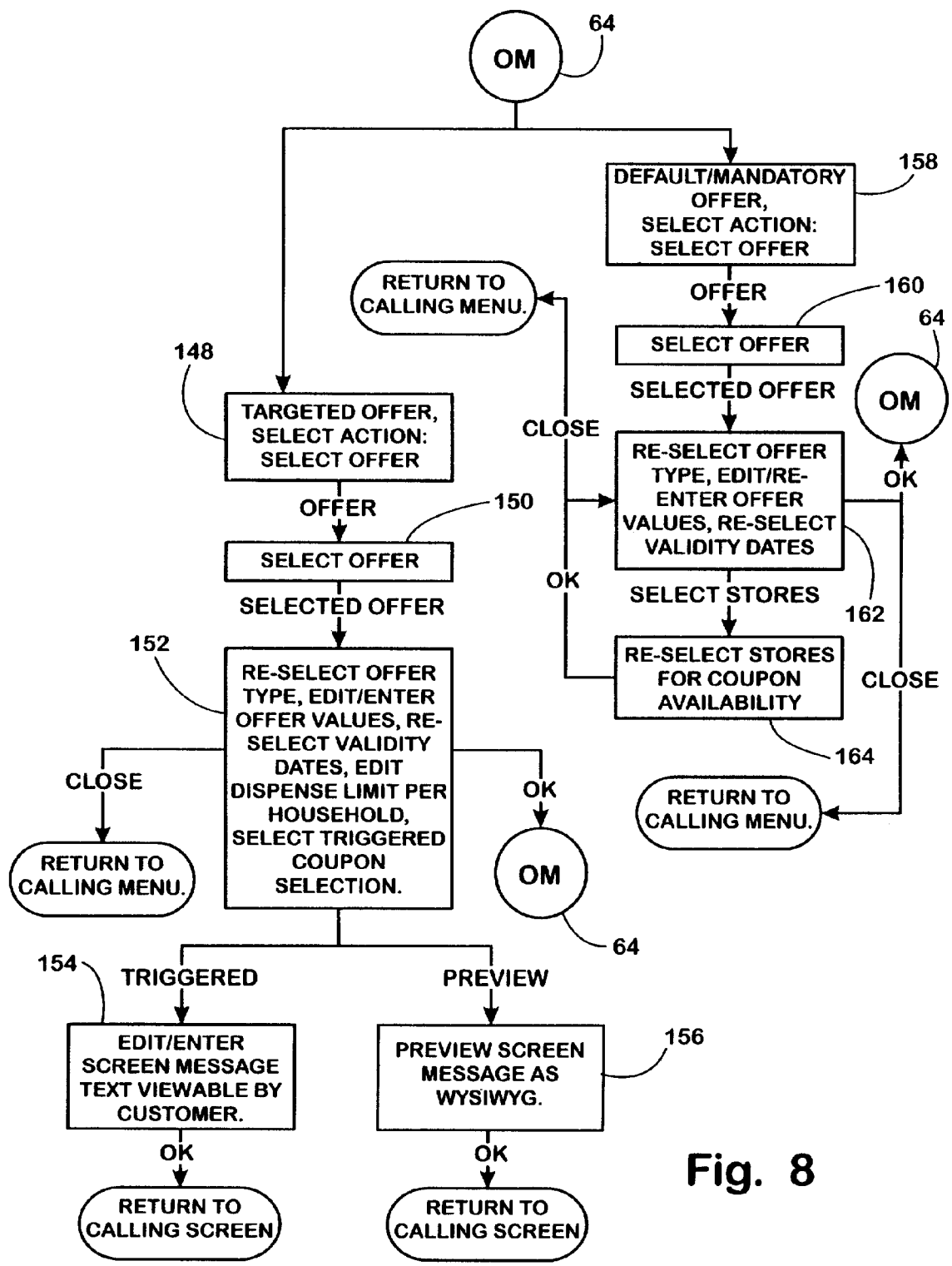
FIG. 8 is a flowchart of an offer maintenance program.

At any time after targeted/default/mandatory offers have been set up, the operator may choose the targeted/default/mandatory offer maintenance selection 62 in order to perform an offer maintenance function 64 which allows the operator to modify any of the parameters of any of the targeted/default/mandatory offers (FIG. 8). The offer maintenance function 64 allows the operator to choose the targeted offer to maintain at 148, which prompts the operator to select the offer at 150, and to reselect any of the parameters of that offer at 152, including offer type, offer values, validity dates, dispense limit per household, and trigger coupon selection. If the coupon-triggered selection is chosen, the operator is prompted at 154 to enter or edit a screen message text which will be viewable by the customer. The operator may then preview the screen message at 156. If the operator chooses to maintain the default/mandatory offers at 158, the operator is prompted to select the offer to be maintained at 160 and to edit the offer type, offer values, or validity dates at 162. The operator may also edit the stores, or outlets, for which the coupon is to be available at 164.

Figure 9:
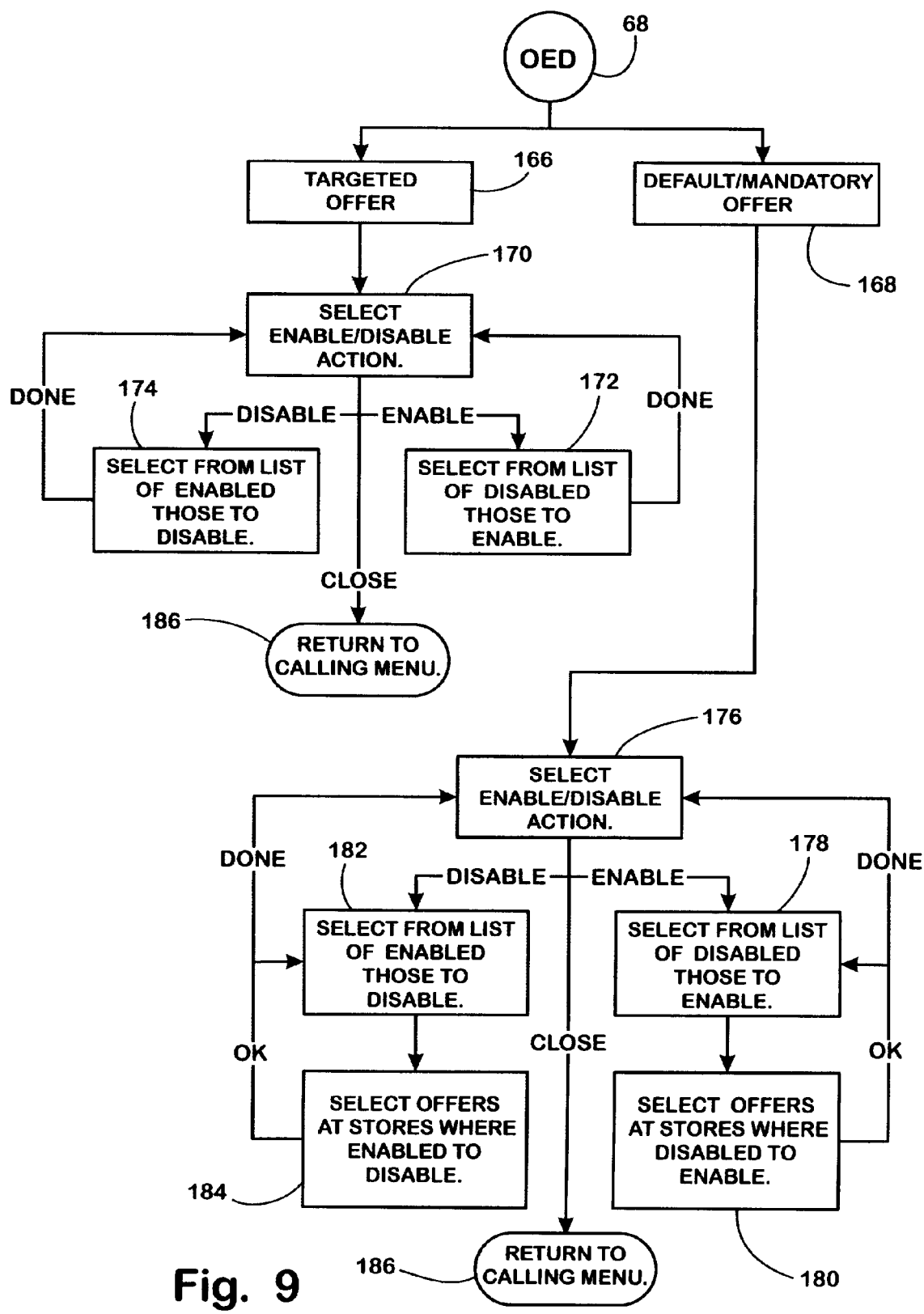
FIG. 9 is a flowchart of an offer enable/disable program.

By choosing the targeted/default/mandatory offer enable/disable selection 66, the operator is provided with a program which allows the operator to enable or disable any coupon offer (FIG. 9). This may be useful, for example, when the retail establishment is notified by the manufacturer that an offer must be withdrawn because of unavailability of merchandise. Without having to delete the offer from the system, the operator may disable the offer. Likewise, offers can be set up in advance and enabled at a later date, if desired. When the offer enable/disable function 68 is selected, the operator is prompted to select whether a targeted offer is to be enabled/disabled at 166 or a default/mandatory offer is to be enabled/disabled at 168. If a targeted offer is selected, the user is prompted to select whether the offer or offers are to be enabled or disabled at 170. If the action is to enable offers, the operator chooses from a list of disabled coupons those to be enabled at 172. If the action is to disable offers, then the operator is prompted at 174 to select from a list of enabled coupons those which are to be disabled. A similar process occurs if default/mandatory offers are to be enabled or disabled (168). The operator chooses at 176 whether the action is to enable or to disable offers. If to enable offers, the operator is prompted at 178 to select from a list of disabled offers those which are to be enabled and to select at 180 at which stores the offers are to be enabled. If the operator chooses to disable offers, the operator is prompted at 182 to select from a list of enabled offers those which are to be disabled and chooses at 184 at which stores the offers are to be disabled. Where the operator has enabled and disabled all desired offers, control returns to the calling program at 186.

Figure 10:
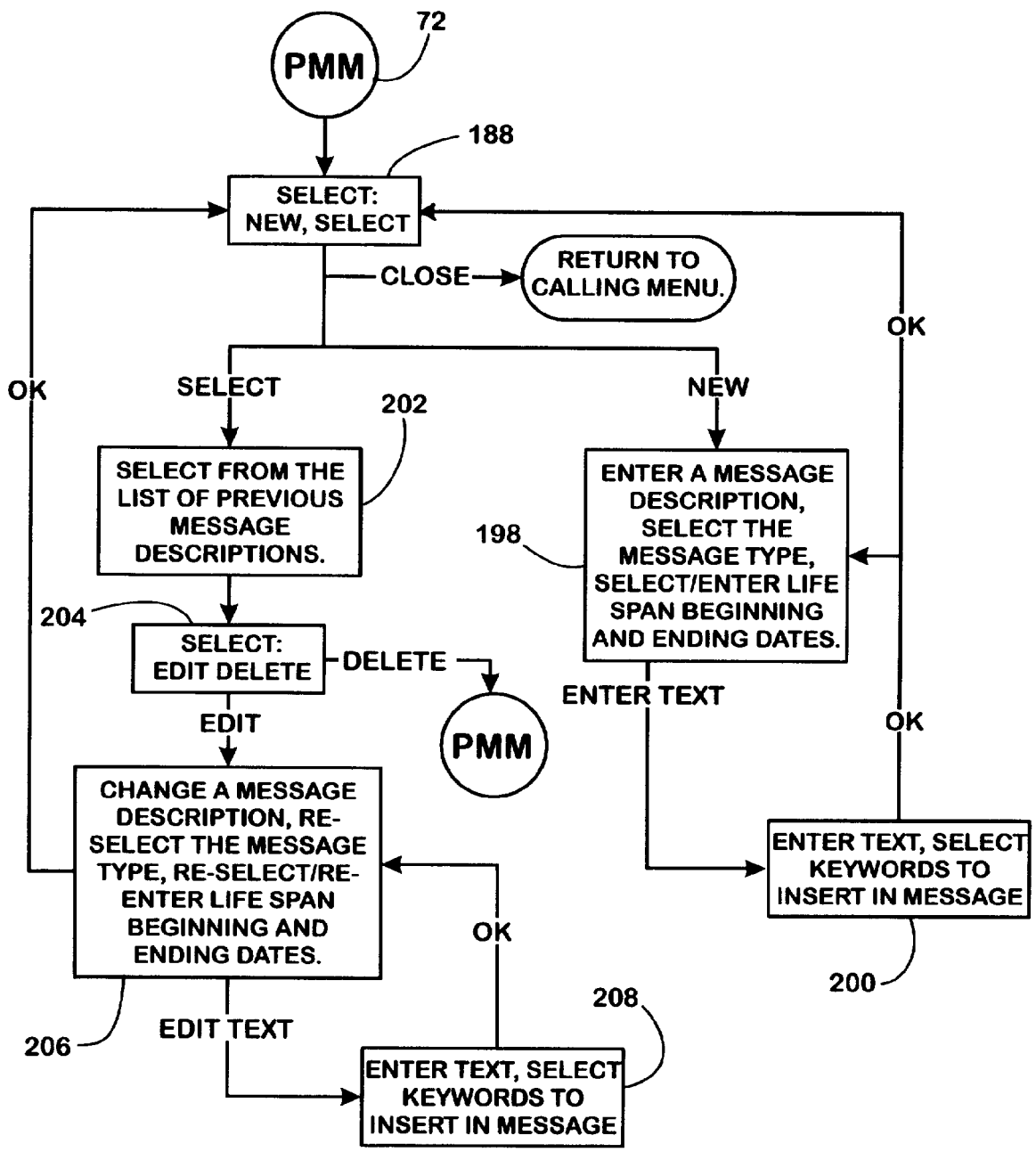
FIG. 10 is a flowchart of a printed message maintenance program.

Printable messages are messages which are targeted to a particular household on the basis of an attribute of the household designating a triggering characteristic. For example, the triggering characteristic may be that the user has accumulated sufficient purchases to qualify for a prize. Printable messages include text, some of which are standard, and others of which are values which are specific to that household. Such household specific values are called "key word values." Key word values relate a specific attribute of the household to a particular text in order to allow a value specific to the household to be inserted into a printed message. Printed messages may be created or maintained by choosing the printed message maintenance selection 70. This calls program 72 which prompts the user to select a printed message to maintain or to enter a new message at 188 (FIG. 10). If a new message is to be entered, the message is entered at 198 including a message description and a triggering characteristic. A life span for the printed message may also be entered at 198. After the text is entered at 198, the key word to be selected in response to occurrence of the triggering characteristic is inserted at 200. If a selected printed message is to be edited, the operator is prompted to select al. 202 from a list of previous message descriptions. The operator may delete the message at 204 or edit the message at 206. The message description, triggering characteristic, and/or life span of the message may be edited. After the text is edited at 206, the key words to be inserted in the message are selected at 208.

Figure 11:
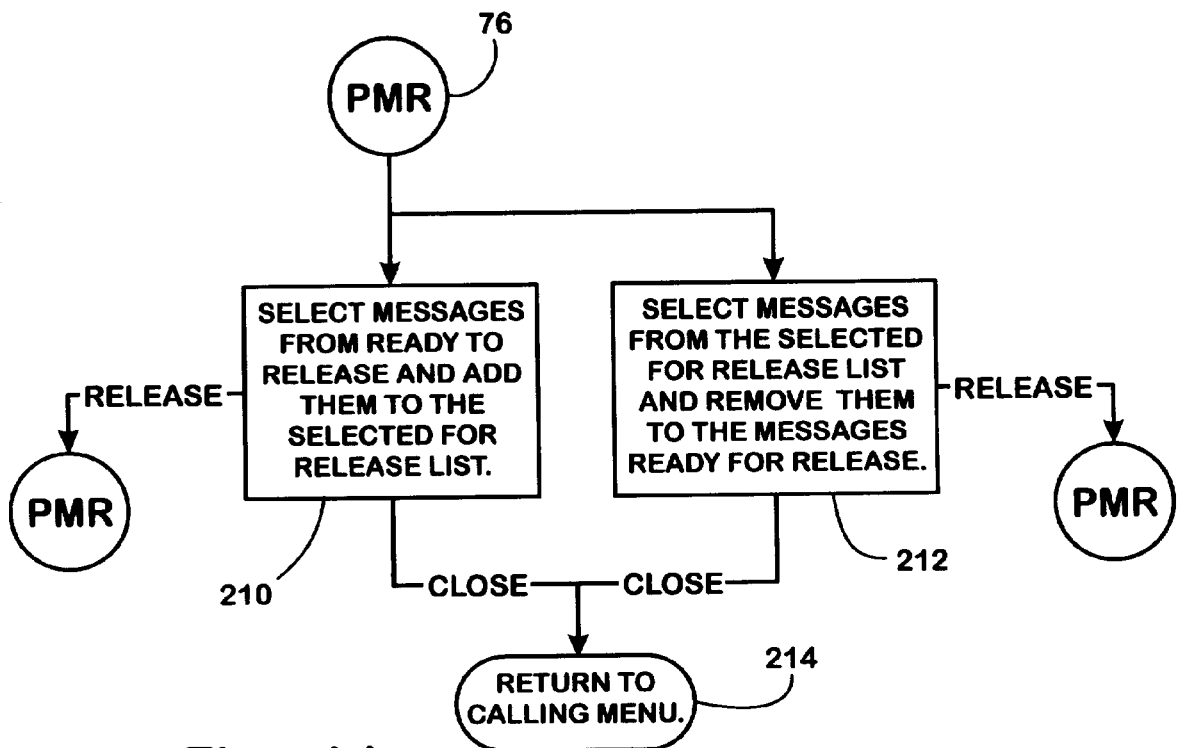
FIG. 11 is a flowchart of a printed message release program.

The printed message release function 76 called by the printed message release selection 74 allows the user to select messages at 210 which are to be added to the list of messages selected for release (FIG. 11). This function allows the operator at 212 to select messages from the list of released messages to be removed from the messages ready to release. After the function is complete, control returns to the calling menu at 214.

Figure 12:
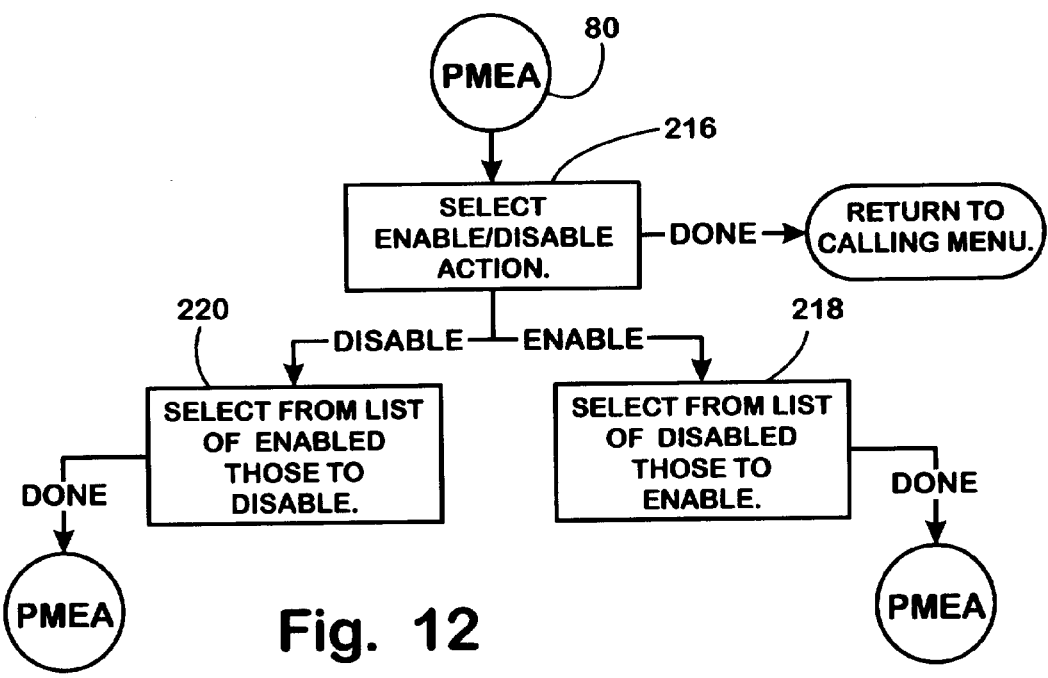
FIG. 12 is a flowchart of a printed message enable/disable program.

The printed message enable/disable function 80, which is called by the printed message enable/disable selection 78, allows the operator to select at 216 whether the operator wishes to enable printed messages or disable printed messages (FIG. 12). If the operator chooses to enable printed messages, then the operator is prompted to select at 218 from a list of disabled messages that are to be enabled. If the operator chooses to disable messages, the operator is prompted at 220 to select from a list of enabled functions those which are to be disabled.

Figure 13:
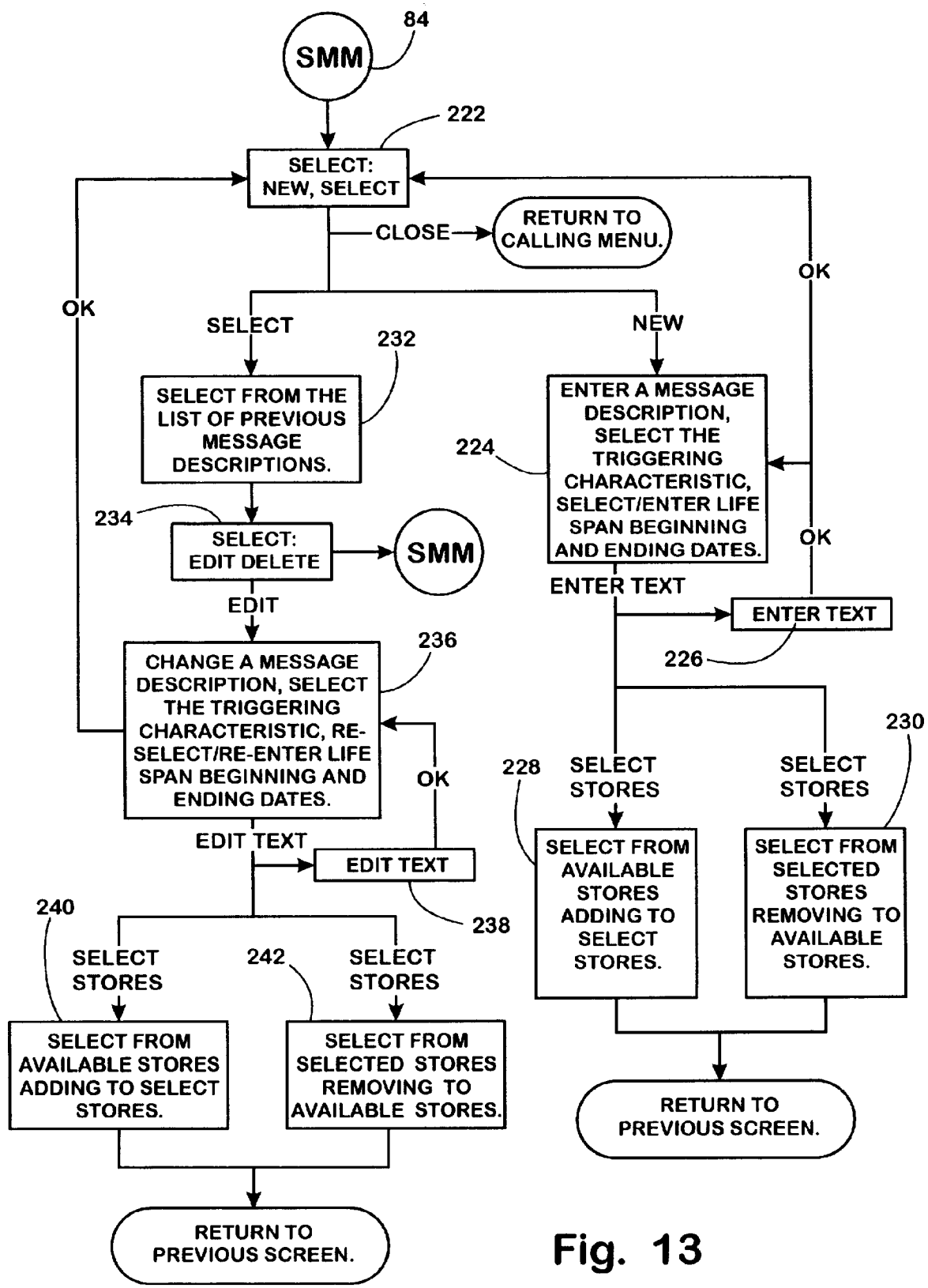
FIG. 13 is a flowchart of a screen message maintenance program.

Screen messages are messages which are displayed while the kiosk is not in use or when a household user is identified or while coupons are being printed. Screen messages may additionally prompt the user to provide a YES/NO response to a question displayed on the screen. Screen messages may be varied between stores in the retail chain. When the screen message setup and maintenance function 84 is called by screen message maintenance selection 82, the operator is prompted at 222 whether the operator will be setting up new messages or maintaining the existing messages (FIG. 13). If new messages are to be set up, the user is prompted at 224 to enter a message description to select the message type and to select a life span for the message. Message type includes cyclic, greeting, thank you, and survey question. After the user has entered the message, the user is prompted at 226 to enter the text of the message. The operator then is prompted to select from available stores whether the newly created message is to be added to those stores at 228. The operator is also prompted to select at 230 from stores previously selected for receipt of the message those for which the message is to be removed. If the operator chooses to edit an existing message, the operator is prompted at 232 to select from a list of previous message descriptions and to select whether to delete the message at 234. If it is not deleted, the operator is prompted at 236 to edit the message description, message type, or message life span. The operator may then edit the text at 238. After the message has been edited, it may be added to selected stores at 240 or removed from selected stores at 242.

Figure 14:
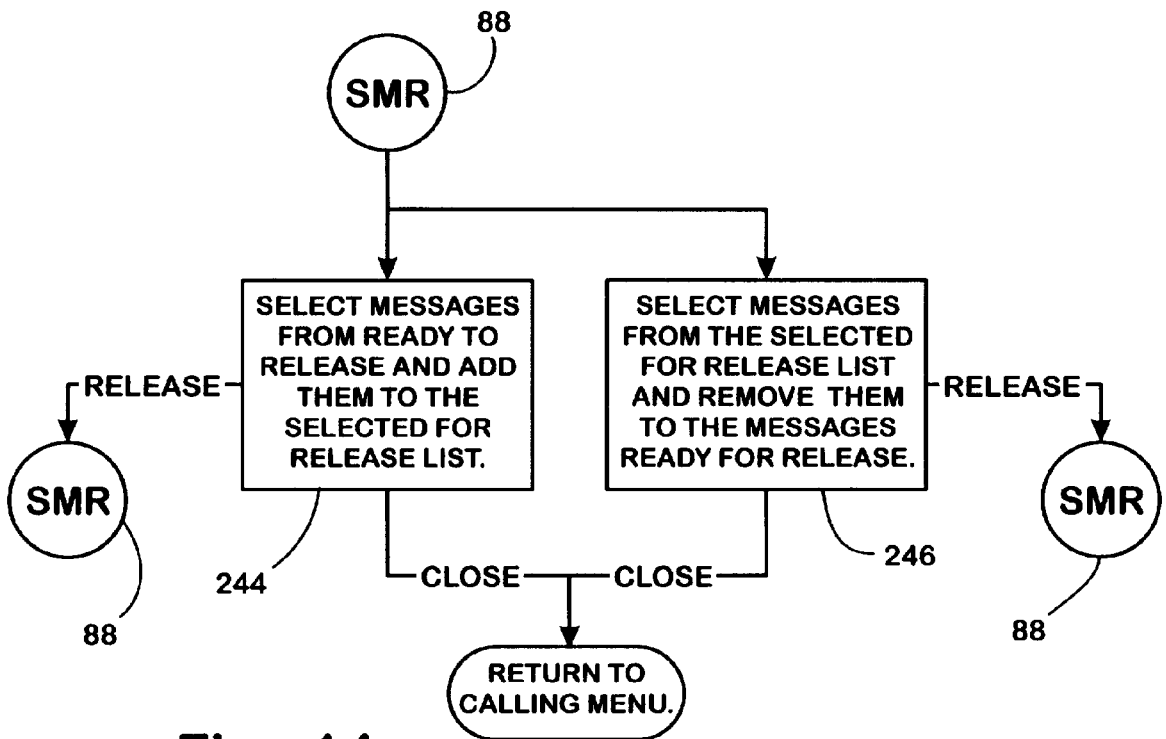
FIG. 14 is a flowchart of a screen message release program.
Figure 15:
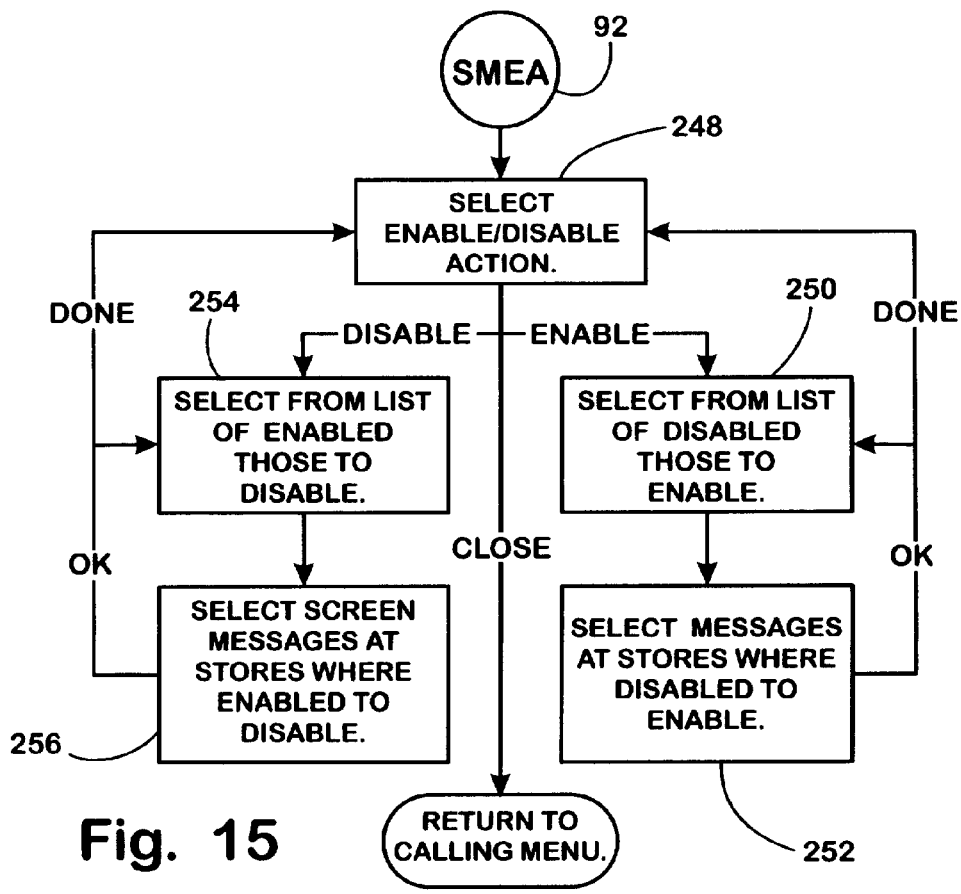
FIG. 15 is a flowchart of a screen message enable/disable program.

If the screen message release function 88 is called by screen message release selection 86, the operator may select at 244 messages to be added to a release list or the operator may choose at 246 to select messages to be removed from the list of messages ready for release (FIG. 14). If the screen message enable/disable function 92 is called by the screen message enable/disable selection 90, the operator chooses at 248 whether to enable or disable a message (FIG. 15). If the operator chooses to enable a message, the operator is prompted at 250 to select from a list of disable messages those to be enabled and to select at 252 which stores the disabled message is to be enabled at. If the operator chooses to disable messages, then the operator is prompted at 254 to select from a list of enabled messages those to be disabled and to select at 256 which stores the messages are to be disabled at.

Figure 16:
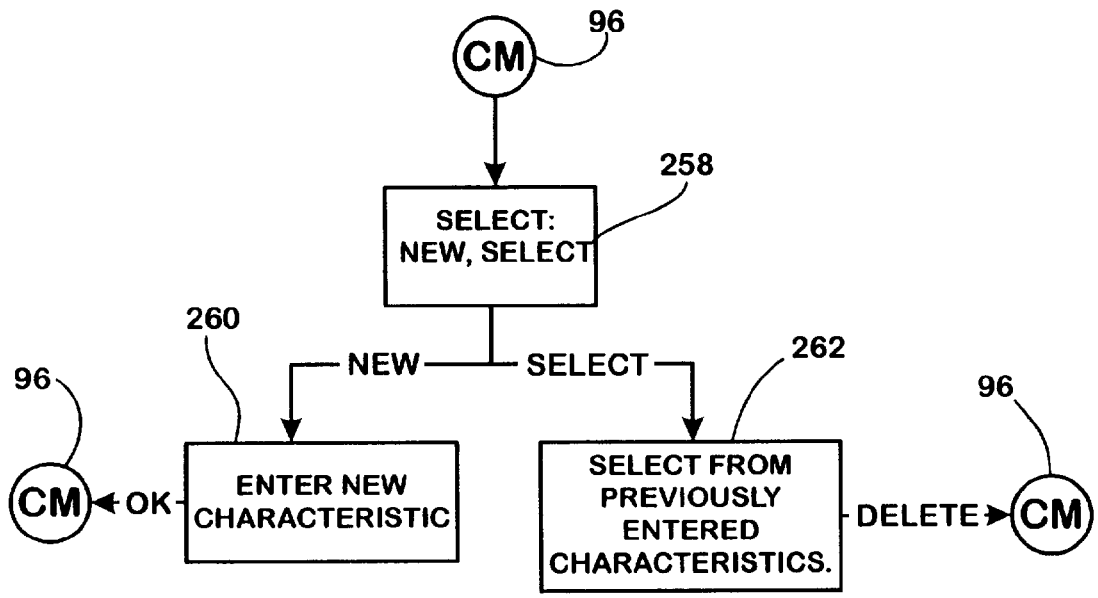
FIG. 16 is a flowchart of a characteristic maintenance program.

The characteristic maintenance function 96 is called from the characteristic maintenance selection 94 when the user wishes to set up or edit a characteristic, such as baby club member (FIG. 16). When selected, the operator is prompted at 258 whether a new characteristic is to be established or an existing characteristic is to be edited. If a new characteristic is to be entered, the operator is prompted at 260 to enter the new characteristic. If an existing characteristic is to be deleted, the user is prompted at 262 to select from a list of previously entered characteristics those that are to be deleted.

Figure 17:
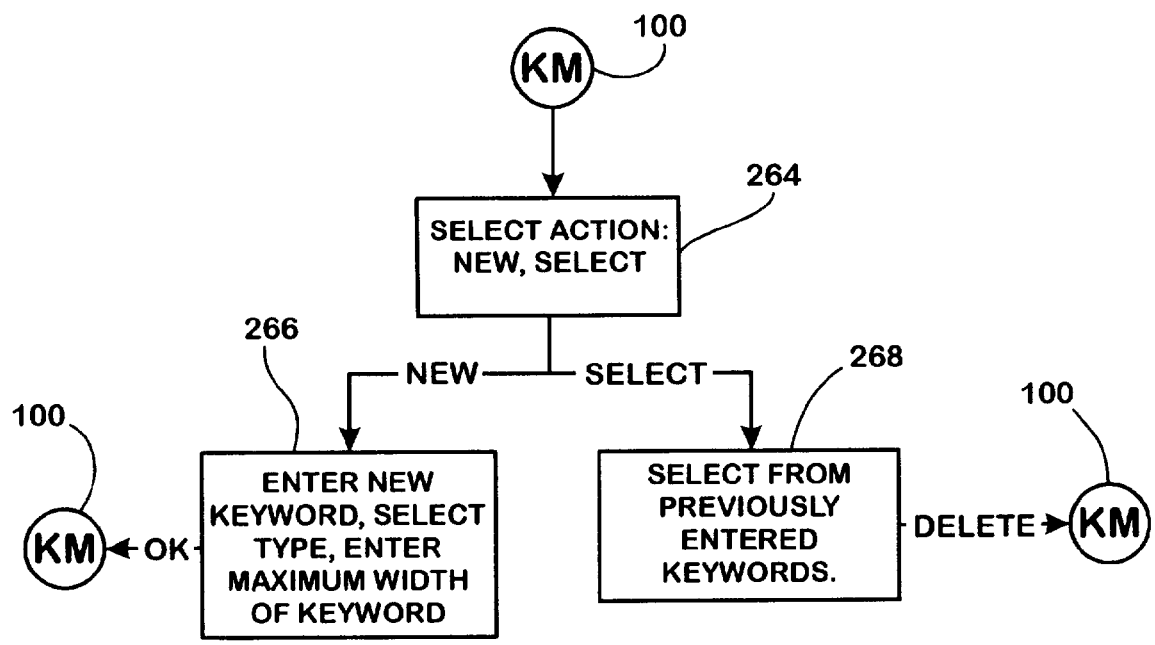
FIG. 17 is a flowchart of a key word maintenance program.

The key word maintenance function 100 is called from the key word maintenance 98 when the user wishes to add or delete key words (FIG. 17). The operator is prompted at 264 whether the operator wishes to add key words or delete key words. If the operator chooses to add key words, the operator is prompted at 266 to enter the new key word to select the key word type and to enter a maximum width of the key word. If the operator selects to delete key words, the operator is prompted at 268 to select from a list of previously entered key words those which are to be deleted.

The previously described routines are carried out by the system operator utilizing management computer 14 in combination with data generated by host-targeting system 38. The result is a series of coupons assigned to each participating household that are enabled and for which the dispense count is less than the dispense limit for the household. This coupon set is retrieved by the kiosk computer in response to identification of that user household at the kiosk. Using a kiosk program 270, images of the coupons in the coupon set are formatted "on the fly" and the coupons are dispensed by the kiosk to the identified user. Referring to FIGS. 18A–18H, kiosk program 270 initializes the kiosk by retrieving settings for mandatory coupons included in the coupon limit at 271. This setting determines whether mandatory coupons are included in the coupon limit or may be provided above the coupon limit. The program next retrieves the setting for pad with default coupons at 272 and retrieves the coupon limit for default coupons at 274. Default coupons are issued upon a failure of the communication system, during which assigned coupons cannot be retrieved for households, or upon initiation of new members. The program next retrieves at 276 the set of cyclic screen messages which are enabled and within the valid date range at the current store. It is determined at 278 whether there are such messages. If so, the cyclic messages are sorted at 280 by starting date range. If it is determined at 278 that there are no cyclic messages, a default set of cyclic messages are retrieved at 282. The cyclic screen messages are pulled into a cyclic message array store at 284.

The set of greeting screen messages, which are enabled and within a valid date range at the current store, are retrieved at 286. It is determined at 288 whether there are any such messages. If there are greeting screen messages, the messages are sorted by starting date range at 290. If there are no greeting screen messages, a set of default greeting screen messages are retrieved at 292. The first greeting screen message is pulled into the greeting screen message store at 294. Only one greeting screen message is used at a time. That message is replaced with a subsequent message when the date range of the first message is exceeded. The program then retrieves the set of thank-you screen messages at 296 and determines at 298 whether there are any such messages. If there are thank-you screen messages, the messages are sorted by starting date range at 299. If there are no stored thank-you screen messages, a default thank-you screen message is retrieved at 300. The first thank-you screen message is pulled at 302 into the thank-you screen message store. Once this first thank-you screen message expires, the thank-you screen message having a next starting date will replace it. The program next retrieves the set of question screen messages which are enabled and within a valid date range for the current store, at 304. If it is determined at 306 that there are such messages, the question screen messages are sorted at 308 by starting date range and pulled into the question screen message array store at 310. No default question screen messages are provided.

Figure 18A:
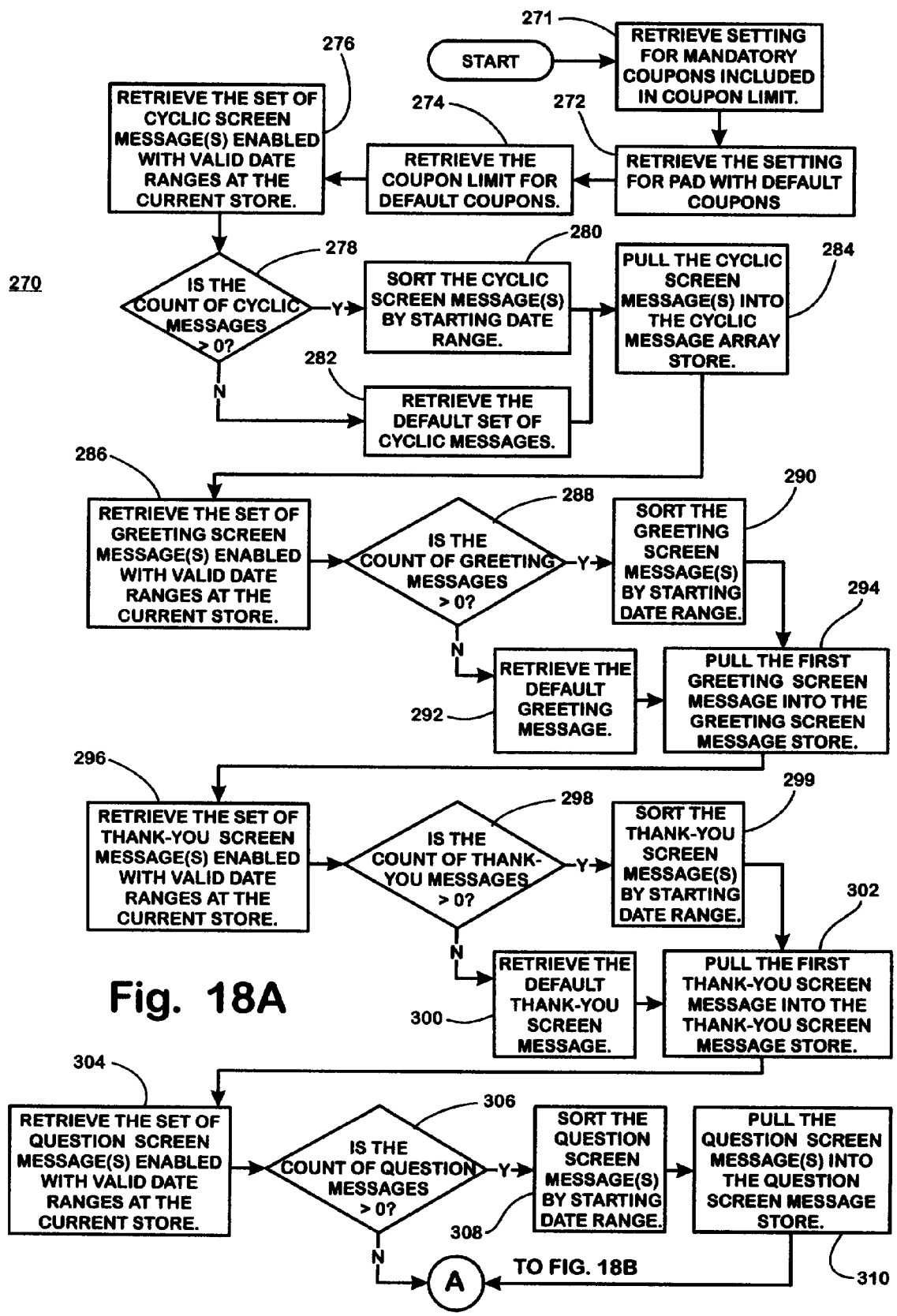
Figure 18B:
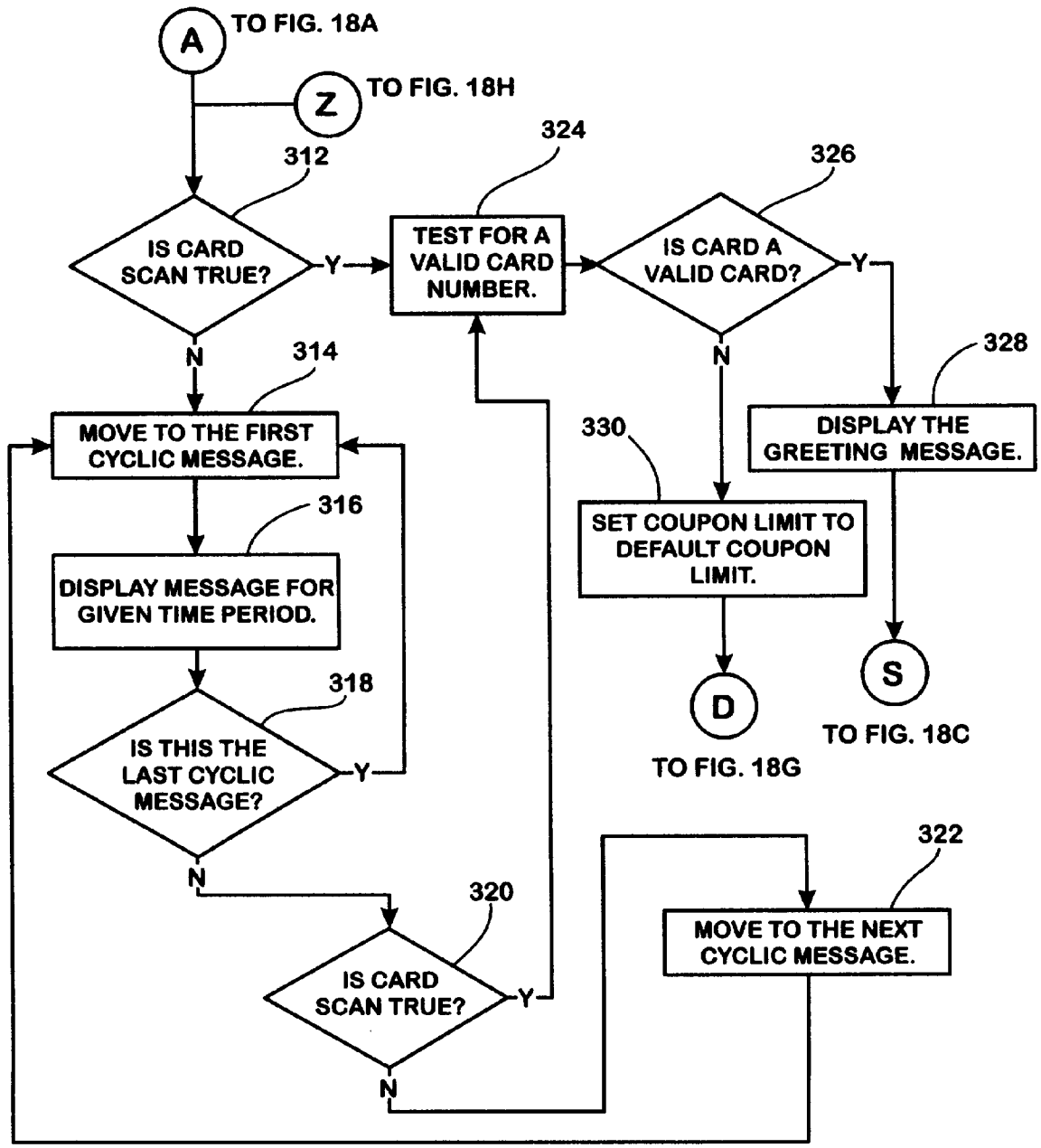
Figure 18C:
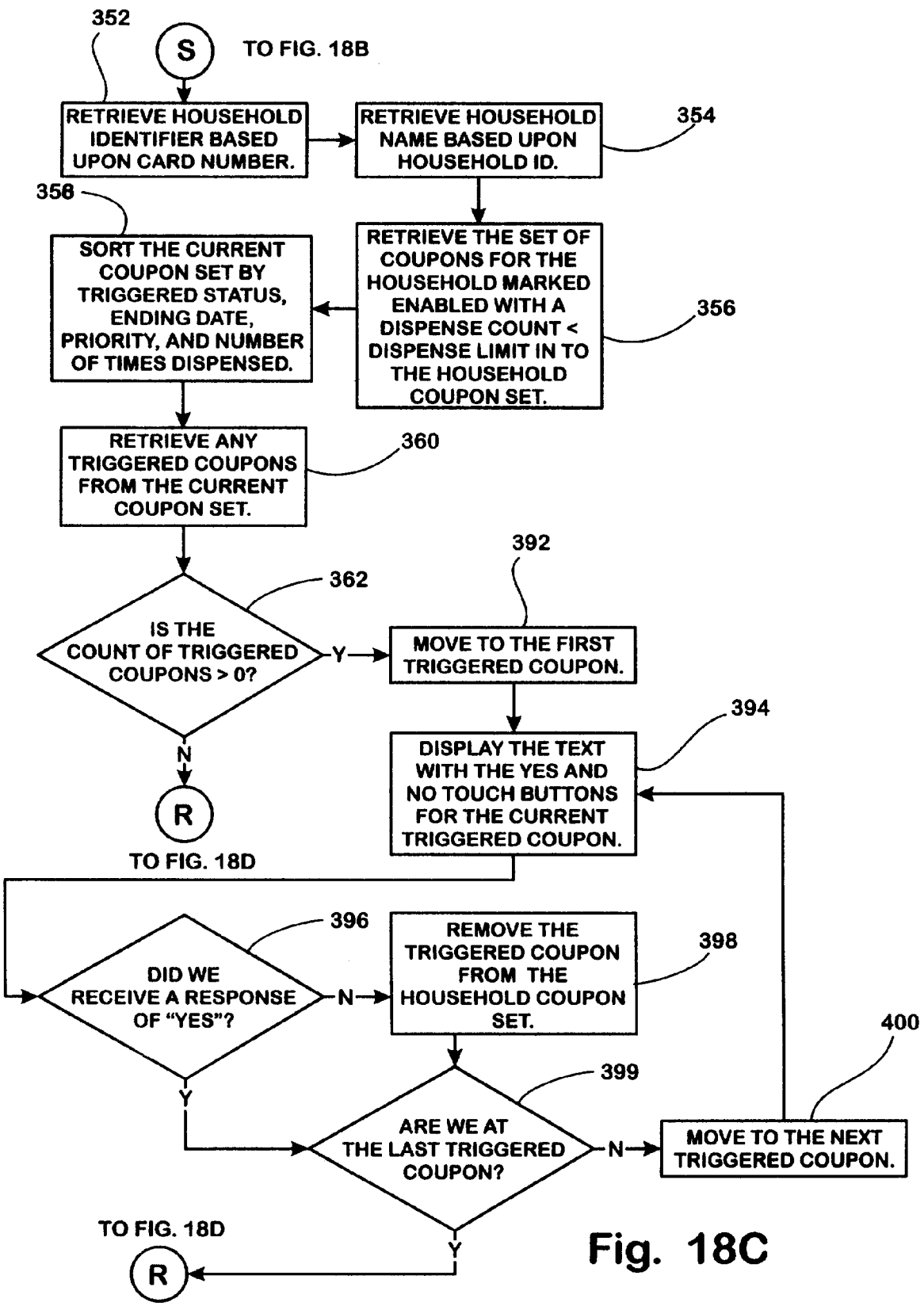

After kiosk initialization, kiosk program 270 waits for a user to identify himself/herself such as by passing a frequent shopper card, encoded with a bar code, in front of scanner 29 or any of the other previously described methods of household identification (FIG. 18B). The program repetitively tests at 312 whether a user is attempting to identify himself/herself. If not, the program moves to the first cyclic message at 314 and displays the message for a particular predetermined length of time at 316. The program then determines at 318 whether the last cyclic message has been displayed. If it is determined at 318 that the last cyclic message was displayed, the program returns to 314 in order to move to the first cyclic message and begin the cycle over. If it is determined at 318 that the list cyclic message has not been displayed, then the program tests again at 320 whether a user attempting to identify himself/herself. If a user is not attempting to identify himself/herself, the program moves to the next cyclic message at 322 and displays that message for a given period of time at 316.

If it is determined at either 312 or 320 that a user is attempting to identify himself/herself, the program tests for a valid match between the scanned household identification number and household identification numbers in its database at 324. If it is determined at 326 that there is a match with an existing household, the greeting message is displayed at 328. If it is determined at 326 that there is not a match with a household in the household's database, then the program sets the coupon limit parameter to a default value at 330. The program then retrieves a set of default coupons at 332 (FIG. 18G) and determines at 334 if any default coupons were retrieved. If it is determined at 334 that there are no default coupons, the program will determine at 336 (FIG. 18E) that there are no coupons in the selected coupon set and will proceed to 441 (FIG. 18F) to retrieve and print messages in a manner which will be described in more detail below. If it is determined at 334 that there are default coupons to be dispensed, the program moves to the first default coupon at 340 and pulls the current default coupon into the selected coupon set at 342. The coupon limit parameter is indexed at 344 and it is determined at 346 whether the coupon limit is reached or the last default coupon has been assigned. If not, the program moves to the next default coupon at 348 and repeats the cycle of assigning the next default coupon to the selected coupon set and indexing the coupon limit parameter.

When it is determined at 346 that either the coupon limit has been reached or the last default coupon has been assigned, the program determines at 336 (FIG. 18E) whether there are any coupons in the selected coupon set. Because there should now be coupons in the selected coupon set, the program moves to 350 for formatting the image of the coupons in the selected coupon set and printing of the coupons, which will be described in detail below.

If it is determined at 326 (FIG. 18B) that a member in the system has identified himself/herself, the greeting message is displayed at 328 and the household identifier is retrieved at 352 (FIG. 18C) for the household matching the scanned card. The household name is then retrieved based upon the household identification at 354. The set of coupons which are assigned to that household and marked enabled and have a dispensed count less than the dispense limit, are retrieved at 356. The dispense count limit allows the operator to limit the number of times each coupon offer may be provided to a household. The retrieved coupons are sorted at 358 into triggered and non-triggered coupons and then by expiration date, priority, and number of times dispensed. The coupons having the closest ending date are assigned first and coupons having a higher priority and a lower number of times dispensed are placed higher in the sort over coupons having lower priority and greater number of times dispensed.

Figure 18D:
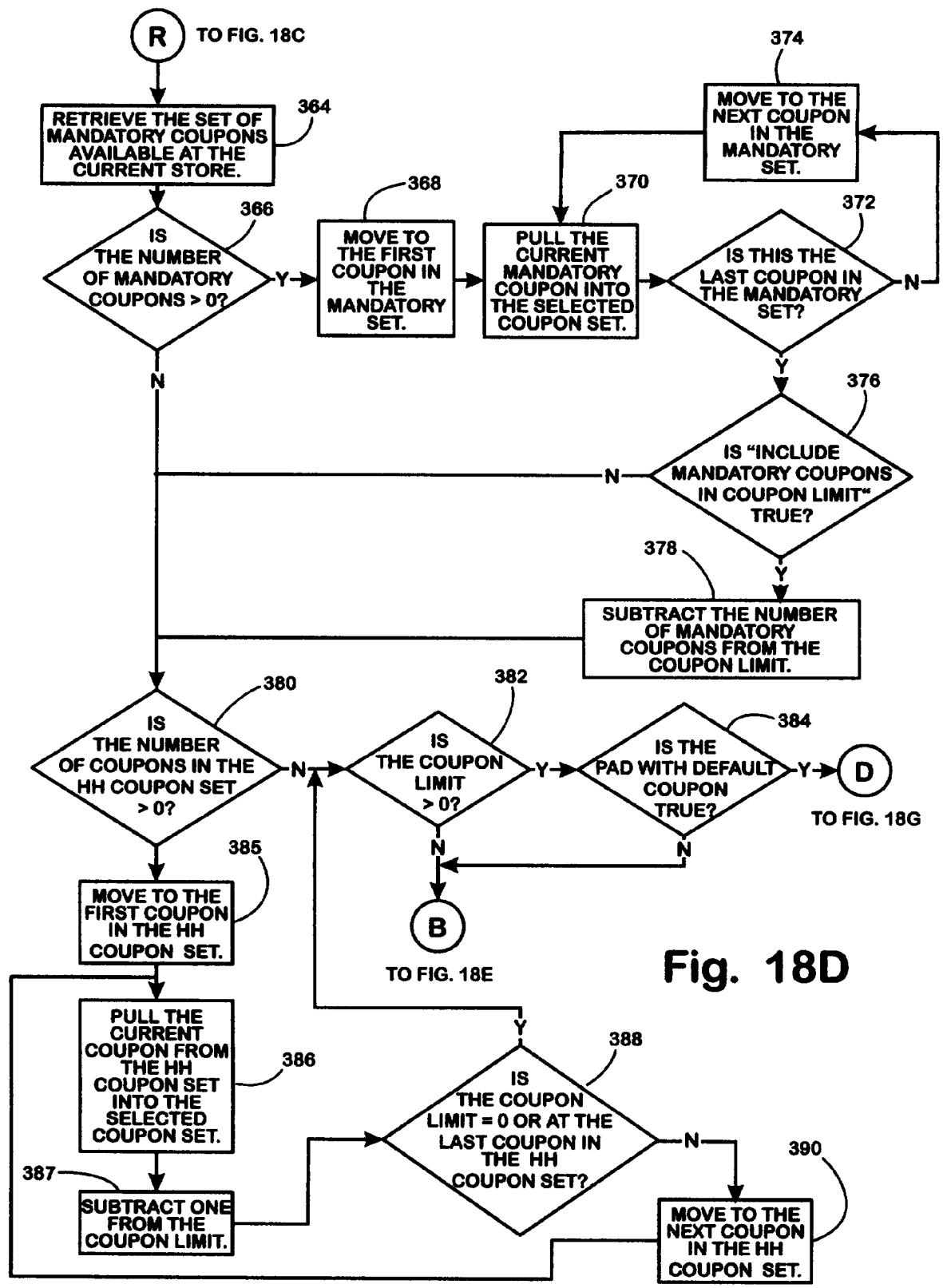

The program then retrieves any triggered coupons at 360 and determines at 362 if any trigger coupons were located. If no trigger coupons were located, the program retrieves the set of mandatory coupons assigned to the current store at 364 (FIG. 18D). It is then determined at 366 if any mandatory coupons were retrieved. If so, the first coupon in the mandatory coupon set is retrieved at 368 and pulled into the selected coupon set at 370. It is then determined at 372 whether the last mandatory coupon has been retrieved. If not, the next coupon in the mandatory set is processed at 374 and 370. When it is determined at 372 that the last coupon in the mandatory set has been pulled into the selected coupon set, it is determined at 376 whether it had previously been chosen that the mandatory coupons are to be included in the coupon limit. If so, the number of mandatory coupons are subtracted from the coupon limit at 378 and the program determines at 380 whether any coupons are in the coupon set. If there are no coupons in the coupon set, it is determined at 382 whether the coupon limit is greater than zero. If not, it will be determined at 336 that the number of coupons in the selected coupon set is not greater than zero and the program will enter the printed message routine at 441 (FIG. 18F). If it is determined at 382 that the coupon limit is greater than zero, it will be determined at 384 whether the pad with the default coupon is true. If so, the default coupons are retrieved at 332 (FIG. 18G). If it is determined at 384 that the pad with default coupons is not true, then the program proceeds to retrieve the printed messages at 441.

If it is determined at 380 that there are coupons in the coupon set, the first coupon in the household coupon set is pulled into the selected coupon set at 385, 386, and the coupon limit is indexed at 387. It is then determined at 388 whether the coupon limit has been met or the last coupon in the household coupon set has been pulled. If not, the next coupon in the household coupon set is pulled into the selected coupon at 390 and 386.

When it is determined at 388 that the coupon limit has been met or the last coupon in the household coupon set has been pulled, the program determines at 382 whether the coupon limit is greater than zero. If the coupon limit is not greater than zero, then the household will not receive default coupons and control passes to 336 where it will be determined that the number of coupons in the selected coupon set is greater than zero. The program will then move to the first coupon in the selected coupon set at 350 and begin to format the image of the selected coupons in a manner which will be described in more detail below. If it is determined at 382 that the coupon limit has not been reached, the household will receive default coupons if it is determined at 384 that the pad with default coupons is true. If so, control passes to 332 (FIG. 18G) for retrieval of the default coupons in a manner previously described.

If it is determined at 362 (FIG. 18C) that there are triggered coupons present, the program moves to the first triggered coupon at 392 and displays (394) the text associated with the triggered coupon along with YES and NO touch buttons on monitor 26. The program then monitors at 396 for receipt of a YES response. If, instead, a NO response is received, the triggered coupon is removed from the household coupon set at 398. The triggered coupon, however, will remain assigned to the household and will be retrieved the next time the household is identified at the kiosk. If the user responds YES at 396, it is then determined at 399 whether the last triggered coupon has been presented to the user. If not, the next triggered coupon is presented to the user at 400 and 394. When it is determined at 399 that the user indicated a desire to obtain the triggered coupon and the last triggered coupon has been processed, control passes to 364 (FIG. 18D) for pulling the remainder of mandatory, targeted, and default coupons into the selected coupon set for that household.

Once the selected coupon set has been completed for the identified household at 350 (FIG. 18E), the program retrieves (402) the coupon offer definition for the first coupon in the selected coupon set. The offer definition record includes: (a) validity date range, (b) offer parameters, (c) text, and (d) offer type. The program then inserts the household name, validity date, and text onto the coupon at 404. Because individual fields are provided on the coupon for the household name, validity date, and text, no additional formatting is required to insert this information onto the coupon image. The program then retrieves the offer-type records for the current coupon offer type at 406. The offer-type records and offer parameters allow the program to construct the offer statement 408 (FIG. 19) of a coupon image 407. Referring to FIG. 19, a text field 410 and validity date field 412 are established in coupon image 407 of a size that allows the coupon text and validity dates to be inserted therein. Likewise, a household name field 416 receives the household name information and directly generates the image thereof.

In order to construct the offer statement 408, the offer statement is broken down into a plurality of variable-size offer statement fields 418*a*–418*d*. The program formats the image of offer statement 408, field-by-field, by combining data in each offer element with an offer parameter or with text contained in the offer element. In the illustrated embodiment, the first offer statement field 418*a*, beginning from the left as viewed in FIG. 19, is a numerical value determined from the offer parameter. This numerical value may be a number of cents off or may be the 1 in a "buy-one get-one free" offer statement. Typically, if the coupon is a number of cents off of a particular item, the description of the item will appear in text field 410 and the only value in the offer parameters will be the number of cents off. The second offer statement field 418*b*, beginning from the left as viewed in FIG. 19, will typically contain text which is included with the offer element. Such text may be "off with this coupon" or the "get" from the buy-one get-one free offer statement. The third offer statement field 418*c*, beginning from the left as viewed in FIG. 19, if present, will typically include a second numeric value obtained from a second offer parameter included with the offer. For example, the third offer statement field may include a dollar amount, such as $50. Therefore, with 300 as the first offer parameter and 5,000 as the second offer parameter, the program can construct the image of the offer statement 408 by offer elements which apply the first offer parameter to the first offer statement field 418*a*, a second offer element applies the text "off" to the second offer statement field 418*b*, and a third offer element applies the second offer parameter to create the numeric value of $50 in the third offer statement field 418*c*. By this process of building an offer statement field from offer parameters contained in a coupon offer definition record and from offer elements contained in offer-type records associated with an offer type, the program is capable of creating the images of coupons "on the fly." Each offer element, in addition to establishing the content of each offer statement field, additionally establishes the area and position of the offer statement field along with type font and the like in order to provide an offer statement which is pleasant in appearance and easy to comprehend. Although four offer statement fields 418a–418d are illustrated, the number used may be selected by the practitioner.

Figure 20:
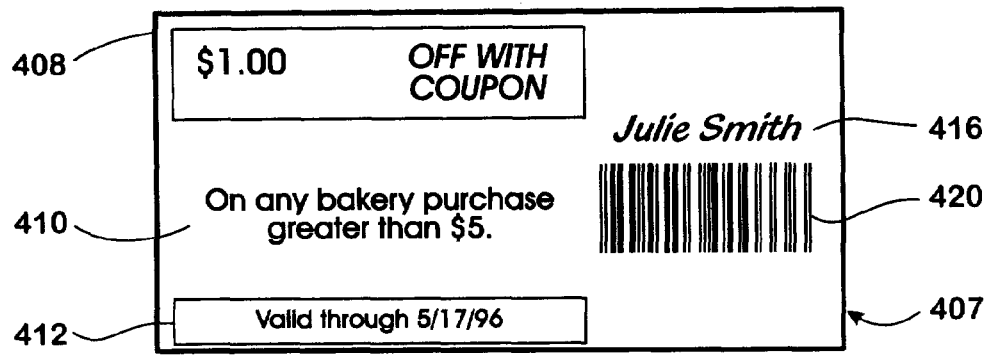
FIG. 20 is an illustration of coupons generated according to the invention.
Figure 20:
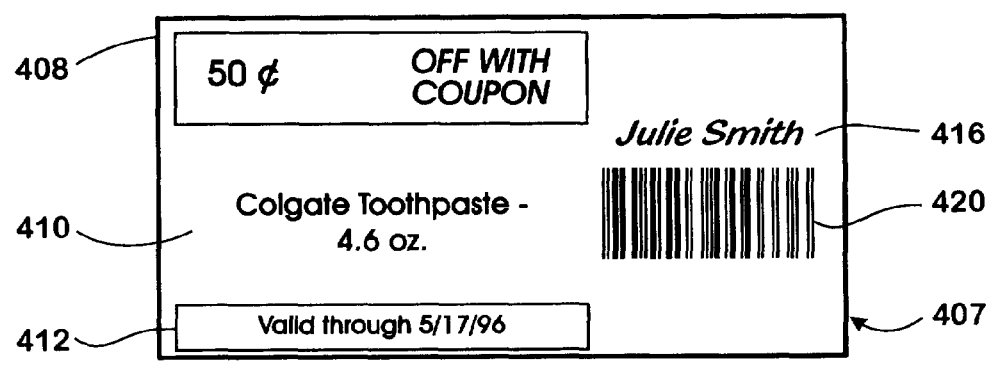
Figure 20:
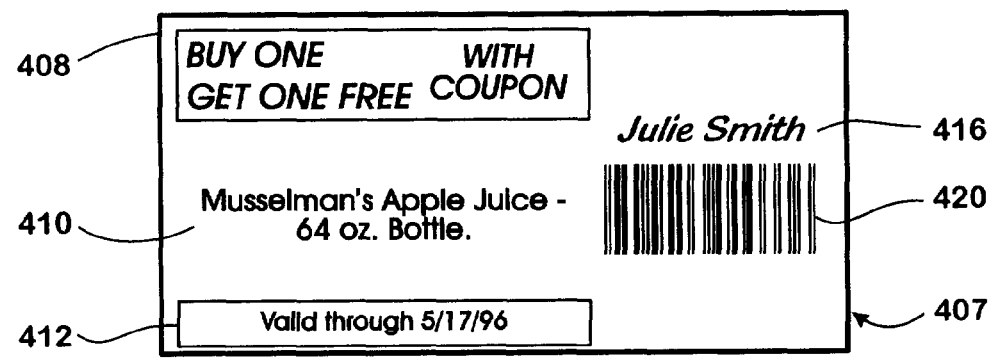
Figure 20:
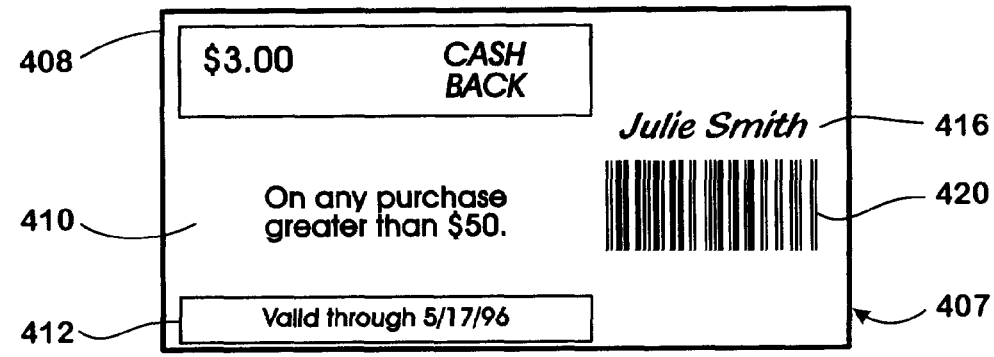

Reference is made to FIG. 20 in which different offer fields 408 are generated by the program "on the fly" and combined with text fields 410 and validity date fields 412 in order to provide a complete coupon image 407. An optional household name field 416 may be generated, if desired. Each coupon additionally includes a bar code 420 which, when read by the scanner of a point-of-sale terminal 34, produces a product lookup number (PLU) which is applied by the point-of-sale terminal to a PLU lookup table in order to determine a price. Because the coupon is in order to provide a discount to the user, the price in the PLU lookup table will be a negative price corresponding to the discount of the coupon. In the illustrated embodiment, there is no validity checking and the cashier must determine that the customer purchased any product receiving a discount or accumulative purchases greater than an amount stated in the offer. However, the invention may additionally be utilized to encode bar code 420 with a more complex coupon definition in order to allow validity checking by including in the bar code a definition of the discounted item or other event which must occur to obtain the discount.

Figure 18E:
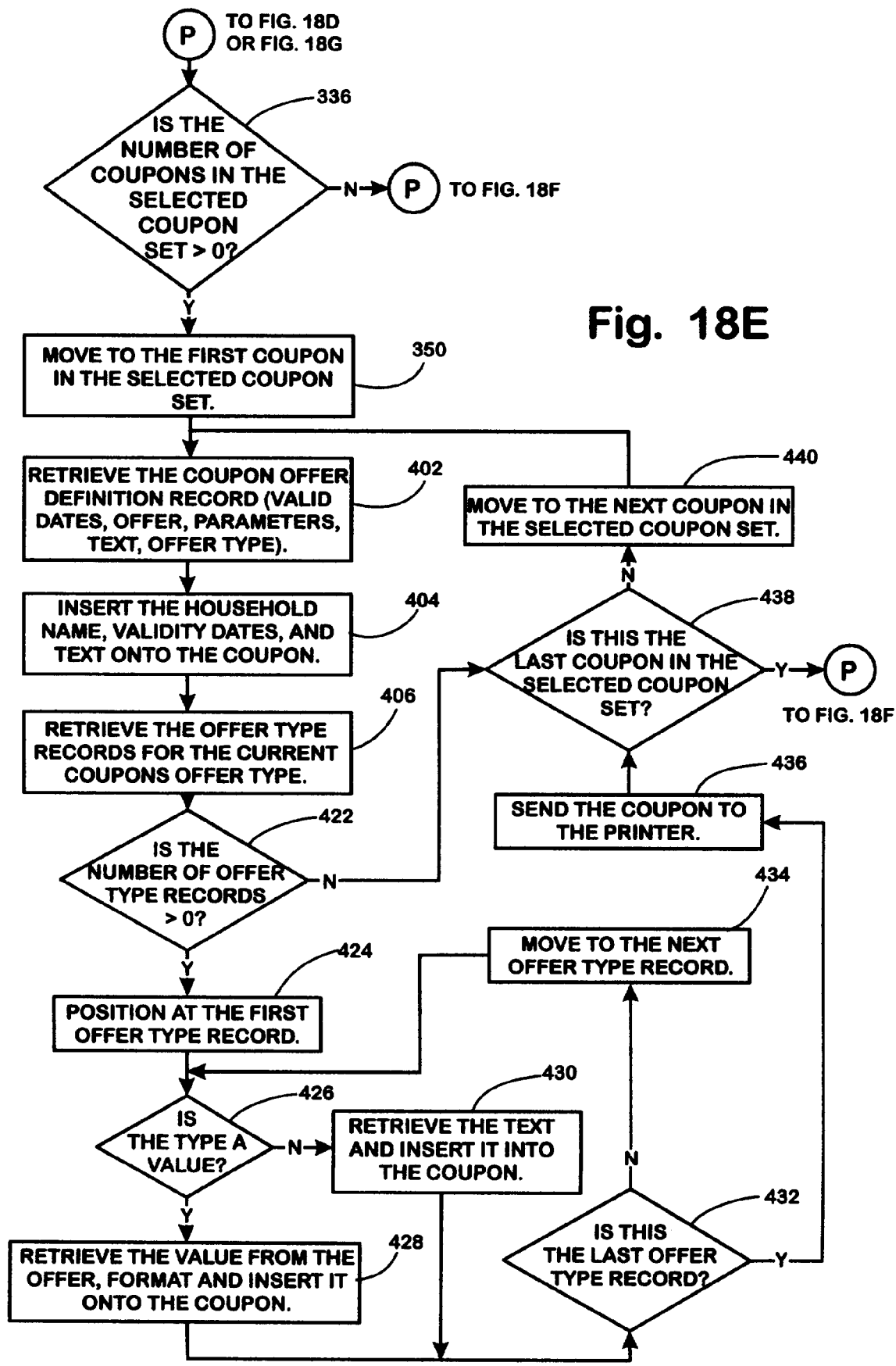
Figure 18F:
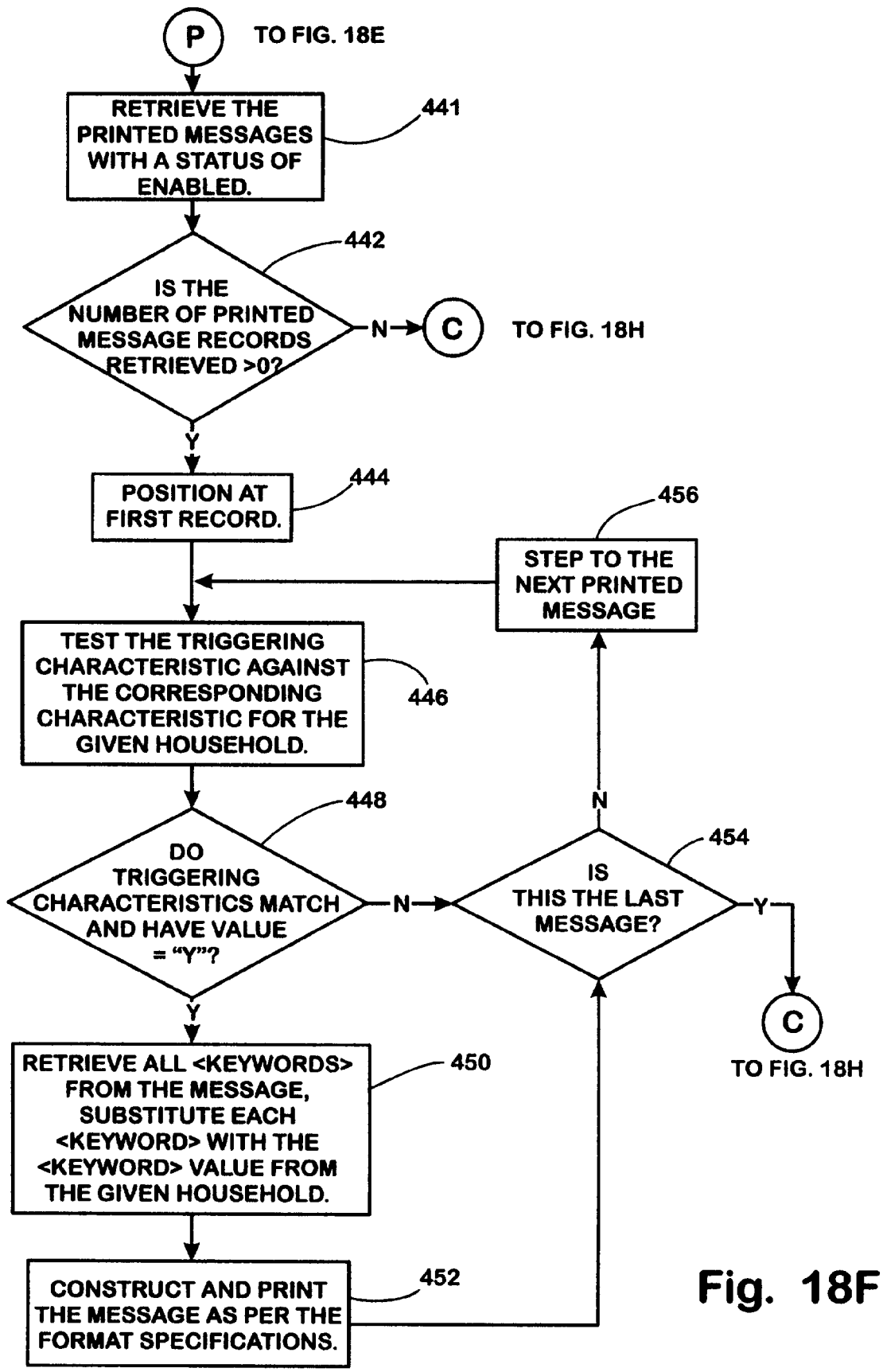
Figure 19:
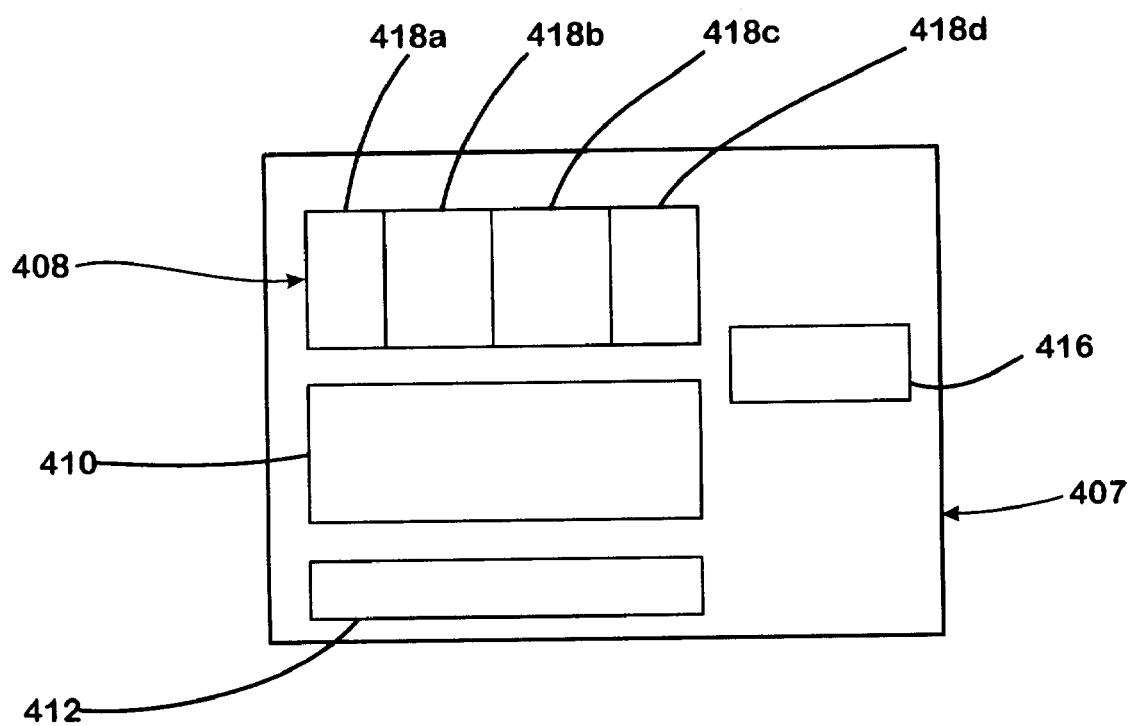
FIG. 19 is an illustration of a coupon image format according to the invention.

In order to construct the image of the offer statement from the offer-type records and the offer parameters, the program determines at 422 whether there are any offer-type records (FIG. 18E). If so, the program looks at the first offer-type record at 424 and determines at 426 if the offer-type in the record is a value. If not, the text included in the offer-type record is retrieved at 430 and inserted into the offer statement field defined in the offer-type record. If it is determined at 426 that the offer type is a value, the amount of the value is retrieved from the offer parameters and inserted into the corresponding offer statement field at 428. The program then determines at 432 whether the last offer-type record had been processed. If not, the next offer-type record is processed at 434 and 426. When it is determined at 432 that the last offer-type record has been processed, the formatted coupon image is sent to the printer at 436. It is then determined at 438 if the last coupon in the selected coupon set has been formatted. If not, the next coupon in the selected coupon set is processed at 440. If it is determined at 422 that no offer-type records are retrieved for a coupon offer, then the program proceeds to 440 in order to process the next coupon. This provides a failsafe exit from the coupon-formatting process if an incomplete coupon definition occurs.

After the coupons have been selected, formatted, and are being printed, the program retrieves (441) the printed messages, which have an enabled status, and determines at 442 if any printed messages were retrieved (FIG. 18F). If so, the first record is tested at 444, 446 in order to determine if the triggering characteristic matches the corresponding characteristic for the identified household. If it is determined at 448 that the triggering characteristic matches and there is a value associated with the printed message, the program retrieves all of the key words from the message at 450 and substitutes each key word with the key word value from the given household. The message is then formatted and printed at 452 in accordance with format specifications. It is then determined at 454 if this was the last message. If it is determined at 454 that this was not the last message, then the next printed message is retrieved at 456 and tested at 446. When it is determined at 454 that the last printed message has been processed, the program then determines if there are valid survey screens available at 458 (FIG. 18H). If not, the kiosk displays the "thank-you" screen until all printing is complete at 460. If there are any valid survey screens available, the program moves to the first survey screen at 460 and displays the message with YES and NO response buttons 462. The program then stores a response from the user at 464. If a response is not received within a predetermined period, it is determined at 466 that the response has timed out and the program is exited. If a response is received before the response is timed out, it is then determined at 468 whether the last survey screen has been processed. If so, the program is exited. If not, the program moves to the next survey screen at 470 and displays the message at 462. Although kiosk program 270 functionally operates a kiosk 24, it may reside on the kiosk computer or another computer.

Thus, it is seen that the present invention provides a unique coupon delivery system which allows targeted coupons to be generated "on the fly" and dispensed at a kiosk on demand by a household user upon identification of the household. Because the coupons are dispensed at the retail establishment, they create a greater impulse purchase effect. Furthermore, consumers obtain coupons when desired rather than when the coupons are printed and mailed by the commercial printer. Because of the rapid cycle time available with the present invention, coupon offers can be created to respond to rapidly changing market conditions, such as direct store purchases as well as notification by a manufacturer that a promotional program is being prematurely ended. The present invention further provides many unique characteristics which take advantage of the kiosk technology in order to enhance a dialog with customers of the retail establishment and to implement, in an efficient fashion, numerous promotional programs, the variations of which are only limited by the imagination of the system operator and management of the retail establishment. This is all accomplished in a cost-effective manner because the cost of mailing coupons is eliminated.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A retail establishment discount coupon generating system, comprising:

a targeting system which assigns coupons to individual households as a function of purchases by each household and generates extract file containing coupon offer definition for substantially all assigned coupons, wherein said coupon offer definition includes an offer description, texts, bar code data and a discount value;

a delivery system which processes the extract file from said targeting system into coupon offer data for particular household which is retrievable by a remote device and stores the coupon offer data for a plurality of households on a particular storage device; and a kiosk positioned at an entry area of a retail establishment including at least a user identification device and an output device wherein said kiosk retrieves data from said delivery system coupon offer data for coupons assigned to the household identified with said identification device and outputs coupons assigned to identified household solely in response to identification of a user; and wherein said delivery system includes an enhancement system which provides tools for enhancing the coupon offer data by designating particular coupon offers as one of a targeted coupon offer assigned to individual households as a function of purchases by that household and a mandatory coupon which is assigned to substantially all households.

2. The discount coupon generating system in claim 1 wherein said delivery system includes a coupon offer database and a household identification database.

3. The discount coupon generating system in claim 1 wherein said enhancement system provides tools to allow particular coupon offers to be designated default coupons which are assigned to households when the number of targeted coupons is fewer than a particular level.

4. The coupon generating system in claim 1 wherein said enhancement system provides tools to allow default coupons to be assigned to households that do not have targeted coupons assigned to them.

5. The discount coupon generating system in claim 1 wherein said enhancement system provides tools to allow an operator to enable and disable coupon offers.

6. The discount coupon generating system in claim 1 wherein said enhancement system provides tools to allow an operator to compose a plurality of printable messages.

7. The discount coupon generating system in claim 6 wherein particular messages are provided to particular households as a function of household attributes.

8. The discount coupon generating system in claim 1 wherein said enhancement system provides tools to allow particular coupon offers to be designated mandatory coupons which are assigned to all households.

9. The discount coupon generating system in claim 1 wherein said enhancement system provides tools to designate particular coupon offers as triggered offers which are deliverable to a household only if the household indicates a wish to received the triggered coupon.

10. The coupon generating system in claim 1 wherein said enhancement system provides tools to provide a valid date range to each coupon offer.

11. The coupon generating system in claim 1 wherein said enhancement system provides tools to enable and disable individual coupon offers.

12. The discount coupon generating system in claim 1 wherein said targeting system assigns coupons as a function of accumulated purchases of each household.

13. The coupon generating system in claim 12 wherein said targeting system assigns coupons as a function of which decile a household's accumulated purchases falls.

14. The discount coupon generating system in claim 1 wherein said targeting system is an RMS system.

15. The discount coupon generating system in claim 1 wherein the delivery system encodes each coupon offer in a manner that a coupon image can be formatted for printing with a printer at the retail establishment.

16. The discount coupon generating system in claim 15 wherein said delivery system encodes each coupon offer with a plurality of variable-size offer statement fields.

17. The discount coupon generating system in claim 1 wherein said extract file is a printable file.

18. A retail establishment discount coupon generating system, comprising:

a targeting and delivery system which assigns coupons to individual households as a function of purchases by each household including coupon offer definition for substantially all assigned coupons, wherein said coupon offer definition includes an offer description, text, bar code data and a discount value;

said targeting and delivery system processes the assigned coupons into coupon offer data for particular households which is retrievable by a remote device and stores the coupon offer data for a plurality of households on a particular storage device;

a kiosk positioned at an entry area of a retail establishment including at least a user identification device and an output device wherein said kiosk retrieves data from said targeting and delivery system coupon offer data for coupons assigned to the household identified with said identification device and outputs coupons assigned to the identified household in response to identification of a user; and wherein said targeting and delivery system includes an enhancement system which provides tools for enhancing the coupon offer data by designating particular coupon offers as one of a targeted coupon offer assigned to individual households as a function of purchases by that household and a mandatory coupon which is assigned to substantially all households.

19. The discount coupon generating system in claim 18 wherein said enhancement system provides tools to allow particular coupon offers to be designated default coupons which are assigned to households when the number of targeted coupons is fewer than a particular level.

20. The discount coupon generating system in claim 18 wherein said enhancement system provides tools to allow an operator to compose a plurality of printable messages.

21. The discount coupon generating system in claim 20 wherein particular messages are provided to particular households as a function of household attributes.

22. The discount coupon generating system in claim 18 wherein said enhancement system provides tools to designate particular coupon offers as triggered offers which are deliverable to a household only if the household indicates a wish to received the triggered coupon.

23. The discount coupon generating system in claim 18 wherein said targeting and delivery system assigns coupons as a function of accumulated purchases of each household.

24. The discount coupon generating system in claim 18 wherein said enhancement system provides tools to allow default coupons to be assigned to households that do not have targeted coupons assigned to them.

25. The discount coupon generating system in claim 18 wherein said enhancement system provides tools to allow an operator to enable and disable coupon offers.

26. The discount coupon generating system in claim 18 wherein said enhancement system provides tools to provide a valid date range to each coupon offer.

27. The discount coupon generating system in claim 18 wherein said enhancement system provides tools to enable and disable individual coupon offers.

28. The discount coupon generating system in claim 18 wherein said targeting and delivery system assigns coupons as a function of accumulated purchases of each household.

29. The discount coupon generating system in claim 28 wherein said targeting and delivery system assigns coupons as a function of which decile a household's accumulated purchases falls.

30. The discount coupon generating system in claim 18 wherein said targeting and delivery system is an RMS system.

31. The discount coupon generating system in claim 18 wherein said targeting and delivery system encodes each coupon offer in a manner that a coupon image can be formatted for printing with a printer at the retail establishment.

32. The discount coupon generating system in claim 31 wherein said targeting and delivery system encodes each coupon offer with a plurality of variable-size offer statement fields.

33. The discount coupon generating system in claim 18 wherein said targeting and delivery system includes a coupon offer database and a household identification database.

* * * * *

UNITED STATES PATENT AND TRADEMARK OFFICE
CERTIFICATE OF CORRECTION

PATENT NO.   : 6,076,068
DATED        : June 13, 2000
INVENTOR(S)  : James P. DeLapa and James W. Willman It is certified that error appears in the above-identified patent and that said Letters Patent is hereby corrected as shown below:

Abstract:
    In totality is not consistent with our patent application.
Column 3, line 56:
    "user's should be --users--
Column 4, line 41:
    After "images" insert --of--
Column 13, line 64:
    "al." should be --at--
Column 16, line 22:
    "list" should be --last--
Column 20, line 57:
    After "generates" insert --an--
Column 20, line 63:
    "household" should be --households--
Column 21, line 4:
    After "to" insert --the--

UNITED STATES PATENT AND TRADEMARK OFFICE
CERTIFICATE OF CORRECTION

Page 2 of 2

PATENT NO.     : 6,076,068
DATED          : June 13, 2000
INVENTOR(S)    : James P. DeLapa and James W. Willman It is certified that error appears in the above-identified patent and that said Letters Patent is hereby corrected as shown below:

Column 21, line 21:
   After "The" insert --discount--
Column 21, line 44:
   After "The" insert --discount--
Column 21, line 47:
   After "The" insert --discount--
Column 21, line 53:
   After "The" insert --discount--

Signed and Sealed this

Twenty-fourth Day of April, 2001

*Attest:*

NICHOLAS P. GODICI

*Attesting Officer*   Acting Director of the United States Patent and Trademark Office